(12) United States Patent
Varma

(10) Patent No.: US 7,519,054 B2
(45) Date of Patent: *Apr. 14, 2009

(54) REPLICATION OF MULTICAST DATA PACKETS IN A MULTI-STAGE SWITCHING SYSTEM

(75) Inventor: Anujan Varma, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 630 days.

This patent is subject to a terminal disclaimer.

(21) Appl. No.: 11/044,095

(22) Filed: Jan. 27, 2005

(65) Prior Publication Data

US 2006/0165111 A1 Jul. 27, 2006

(51) Int. Cl.
*H04L 12/28* (2006.01)
*H04L 12/56* (2006.01)
*H04L 12/50* (2006.01)
*H04Q 11/00* (2006.01)
*G01R 31/08* (2006.01)
*G06F 11/00* (2006.01)
*G08C 15/00* (2006.01)
*H04J 1/16* (2006.01)
*H04L 1/00* (2006.01)
*H04L 12/26* (2006.01)
*H04L 12/16* (2006.01)

(52) U.S. Cl. ...................................... 370/388; 370/390

(58) Field of Classification Search ................. 370/389, 370/351, 352, 229, 388, 390
See application file for complete search history.

(56) References Cited

U.S. PATENT DOCUMENTS

| | | | |
|---|---|---|---|
| 5,499,374 A * | 3/1996 | Di Giulio et al. ............. 710/240 |
| 5,689,506 A * | 11/1997 | Chiussi et al. ............... 370/388 |
| 5,703,879 A | 12/1997 | Proctor et al. ............... 370/398 |
| 5,768,257 A | 6/1998 | Khacherian et al. ......... 370/229 |
| 6,335,992 B1 | 1/2002 | Bala et al. |

(Continued)

FOREIGN PATENT DOCUMENTS

WO    WO-0076256 A1    12/2000

(Continued)

OTHER PUBLICATIONS

Nadir, Mir, A Survey of Data Multicast Techniques, Architectures, and Algorithms, IEEE Communications Magazine, Sep. 2001, pp. 165-166.*

(Continued)

*Primary Examiner*—Daniel J Ryman
*Assistant Examiner*—Christopher Crutchfield
(74) *Attorney, Agent, or Firm*—Ryder IP Law; Douglas J. Ryder

(57) ABSTRACT

In general, in one aspect, the disclosure describes a multi-stage switch having at least one ingress switch module to receive data and to generate frames that are transmitted as a wavelength division multiplexed signal. The multi-stage switch further includes a core switch module operatively connected to receive the wavelength division multiplexed signal from the at least one ingress switch module and to switch the frames. The multi-stage switch additionally includes at least one egress switch module to receive the wavelength division multiplexed signal from the core switch module and to transmit data. The at least one ingress switching module and the at least one egress switching module are capable of replicating multicast data packets.

27 Claims, 20 Drawing Sheets

U.S. PATENT DOCUMENTS

| | | | |
|---|---|---|---|
| 6,418,115 B1 | 7/2002 | Iino et al. | 370/217 |
| 6,466,343 B1* | 10/2002 | Lahat et al. | 398/82 |
| 6,665,495 B1* | 12/2003 | Miles et al. | 398/54 |
| 6,690,851 B1* | 2/2004 | Guilfoyle | 385/18 |
| 6,888,848 B2 | 5/2005 | Beshai et al. | |
| 6,940,851 B2* | 9/2005 | Oki et al. | 370/388 |
| 6,990,063 B1* | 1/2006 | Lenoski et al. | 370/218 |
| 6,999,413 B2* | 2/2006 | Moriwaki et al. | 370/228 |
| 7,088,710 B1* | 8/2006 | Johnson et al. | 370/357 |
| 2002/0085578 A1 | 7/2002 | Dell et al. | 370/422 |
| 2002/0131412 A1* | 9/2002 | Shah et al. | 370/390 |
| 2002/0136484 A1 | 9/2002 | MacDonald | 385/17 |
| 2002/0197001 A1* | 12/2002 | Hayashi et al. | 385/17 |
| 2005/0031250 A1 | 2/2005 | Schroeder | |
| 2005/0243825 A1* | 11/2005 | Bitar et al. | 370/390 |
| 2006/0165098 A1 | 7/2006 | Varma | 370/397 |
| 2006/0165112 A1 | 7/2006 | Varma | 370/428 |
| 2007/0171900 A1* | 7/2007 | Beshai et al. | 370/380 |

FOREIGN PATENT DOCUMENTS

| | | |
|---|---|---|
| WO | WO-2006081128 A1 | 8/2006 |

OTHER PUBLICATIONS

"Search Report PCT/US2006/001920", 11 pages.

"Search Report PCT/US2006/001921", 13 pages.

Chiussi, F. M., "Scalable Electronic Packet Switches". *IEEE Journal on Selected areas in Communication*, 21(4), (May 1, 2003),486-500.

Varma, Anujan, et al., "Chapter 4: Theory of Multistage Interconnection Networks", *Interconnection Networks for Multiprocessors and Multicomputers: Theory and Practice, IEEE Computer Society Press*, 1993, 104-175.

Varma, Anujan, et al., "Chapter 7: Fault-Tolerance and Reliability", *Interconnection Networks for Multiprocessors and Multicomputers: Theory and Practice, IEEE Computer Society Press*, 1993, 296-303.

Varma, Anujan, "Multi-Stage Packet Switching System", U.S. Appl. No. 11/044,242, filed Jan. 27, 2005, 32.

Varma, Anujan, "Multi-Stage Packet Switching System with Alternate Traffic Routing", U.S. Appl. No. 11/044,096, filed Jan. 27, 2005, 31.

"Written Opinion of the International Searching Authority", PCT/US2006/001921, 9 pgs.

"Written Opinion of the International Searching Authority", PCT/US2006/001920, 8 pgs.

* cited by examiner

| NUMBER OF FRAMES OF DATA QUEUED | 4-BIT ENCODING |
|---|---|
| EMPTY | 0000 |
| 0.0 - 0.25 FRAME | 0001 |
| 0.25 - 0.5 FRAME | 0010 |
| 0.5 - 0.75 FRAME | 0011 |
| 0.75 - 1.0 FRAME | 0100 |
| 1.0 - 1.25 FRAME | 0101 |
| 1.25 - 1.5 FRAME | 0110 |
| 1.5 - 1.75 FRAME | 0111 |
| 1.75 - 2.0 FRAME | 1000 |
| 2.0 - 2.25 FRAME | 1001 |
| 2.25 - 2.5 FRAME | 1010 |
| 2.5 - 2.75 FRAME | 1011 |
| 2.75 - 3.0 FRAME | 1100 |
| 3.0 - 3.25 FRAME | 1101 |
| 3.25 - 3.50 FRAME | 1110 |
| > 3.50 FRAME | 1111 |

*FIG. 7*

REPLICATION OF MULTICAST DATA PACKETS IN A MULTI-STAGE SWITCHING SYSTEM

BACKGROUND

Store-and-forward devices (e.g., switches and routers) are used in packet networks, such as the Internet, for directing traffic at interconnection points. These switches and routers include switching fabrics which range from a simple bus-based fabric to a fabric based on crossbar (or crosspoint) switching devices. The choice of fabric depends on the design parameters and requirements of the switch or router, such as the port rate, maximum number of ports in the system, performance requirements, reliability/availability requirements, packaging constraints, etc. Crossbar-based fabrics are the preferred choice for high-performance routers and switches because of their ability to provide high switching throughputs.

A typical switch or router contains a set of interfaces or ports, each of which connects to an external link. The interfaces generally reside on a set of circuit boards, called "line cards" or "port interface cards". A packet arriving from an external link first passes through a port interface in the line card. The port interface may be a framer, a medium access control device, etc. The packet is then processed in a packet processor and traffic manager device, which provides the functions of forwarding, classification and queuing based on its class of service, etc. The switching fabric receives the packet and forwards it to the line card corresponding to its destination port (which may be more than one for a multicast packet being sent to multiple destinations). The switching fabric thus provides the re-configurable data paths over which packets can be transported from one port to another within the router or switch.

A general crossbar-based packet switching fabric consists of a crossbar switching matrix, a fabric scheduler, and input buffers to hold arriving packets. The crossbar matrix is logically organized as an array of N×N switching points, thus enabling any of the packets arriving at any of the N input ports to be switched to any of the N output ports. These switching points are configured in the fabric scheduler at packet boundaries. Typically, the packets are switched through the crossbar switching matrix in batches, where a batch consists of at most one packet selected from each input port in such a way that no more than one of the packets is destined for each output port.

In a general crossbar-based switching fabric, each of the packets arriving into one of the input buffers has a header containing the destination port number where it needs to be switched. The fabric scheduler periodically reads this information from the headers of the packets stored in the input buffers and schedules a new batch of packets to be transferred through the crossbar matrix. Because each of the output ports is distinct, the fabric scheduler can schedule all the packets in a batch (a maximum of N packets) for transfer in parallel across the crossbar switching matrix. While the packets from a batch are being transferred through the crossbar, the scheduler can select the packets to form the next batch, so that the transmission can be nearly continuous. At the end of each batch of packets, the fabric scheduler re-configures the crossbar switching matrix so as to connect each input port to the correct output port for the next packet.

Single crossbar switch fabrics are difficult to scale to a large number of ports because of the complexity of implementing a large crossbar matrix (the complexity is of the order of $N^2$, where N is the number of ports); heat dissipation; and simultaneous-switching noise. Thus, large switching fabrics are achieved by cascading multiple crossbar modules in a multistage configuration.

When multicast packets are received by a store-and-forward device (e.g., switch, router), the store-and-forward device must copy the packets and transmit the packets to the specified destination ports. This replication function naturally belongs to the switch fabric of the router. The copying operation can be expensive in terms of internal resources of the router such as bandwidth and memory needed to store lookup tables. Look-up tables are utilized to determine how many copies of the packet need to be made and where the copies need to be transmitted to. A difficulty with handling multicast packets in a multistage switch fabric is the size of the lookup tables needed. The size of these tables increases both with the number of ports in the system and the number of distinct multicast groups that needs to be supported.

BRIEF DESCRIPTION OF THE DRAWINGS

The features and advantages of the various embodiments will become apparent from the following detailed description in which:

FIG. 7 illustrates an exemplary encoding scheme for quantizing the amount of data based on frames, according to one embodiment;

DETAILED DESCRIPTION

Figure 1:
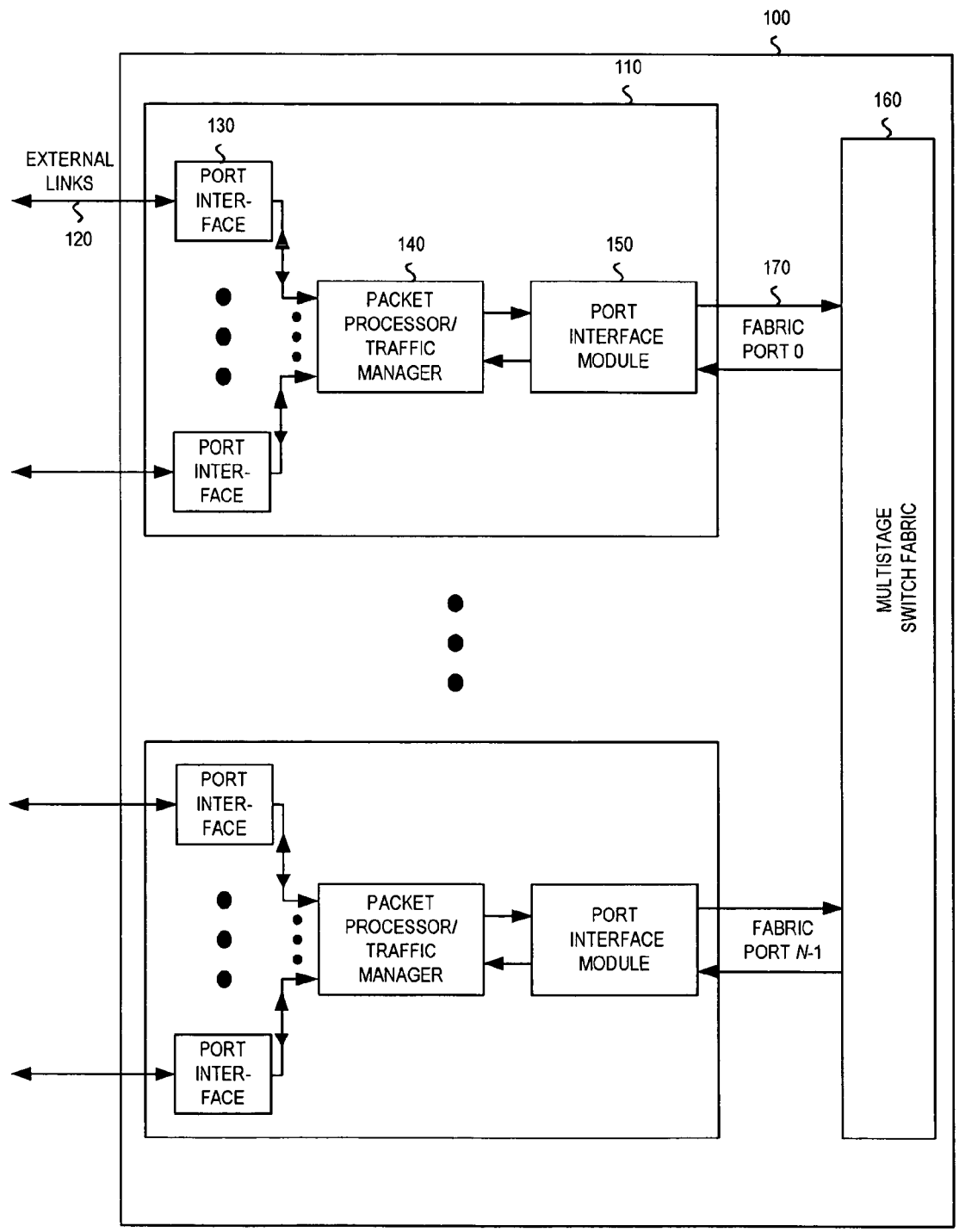
FIG. 1 illustrates an exemplary block diagram of a switching system, according to one embodiment.

FIG. 1 illustrates an exemplary block diagram of a switching system 100. The switching system 100 includes a plurality of port interface modules 110 and a multistage switch fabric 160. The multistage switch fabric 160 has a plurality of ports corresponding to the plurality of interface modules 110. The port interface modules 110 include port interfaces 130, packet processor/traffic managers 140, and fabric port interface modules 150. The interface modules 110 receive packets from external links 120 at the port interfaces 130. The packet processor/traffic manager 140 receives the packets from the port interfaces 130, processes the packets, determines a fabric port number associated with the packet (from a header lookup), and attaches this information to the packet for use by the multistage switch fabric 160. The fabric port interface modules 150 receive the packets from the packet processor/traffic manager 140 and send the packet(s) to the multistage switch fabric 160. The multistage switch fabric 160 switches the packets for transfer to another interface module 110. The links between the fabric port interface modules 150 and the multistage switch fabric 160 are known as fabric ports 170.

The fabric port interface modules 150 receive packets arriving from the multistage switch fabric 160 via a fabric port 170 and pass them on to the packet processor/traffic manager 140 for any processing needed on the egress side. The port interfaces 130 transmit the. packets out on the external links 120. A fabric port 170 may aggregate traffic from more than one external link associated with a line card, so a one-to-one correlation is not necessary.

The parts of the port interface modules 150 that transmit data to the multi-stage switch fabric 160 are referred to as ingress port interface modules and the parts of the port interface modules 150 that receive data from the multi-stage switch fabric 160 are referred to as egress port interface modules. A pair of ingress and egress port interface modules together forms the fabric port interface 150. Such a pair of ingress and egress port interface modules is associated with each fabric port 170. When used herein the term fabric port 170 may refer to an ingress port interface module and/or an egress port interface module. An ingress port interface module may be referred to as an ingress fabric interface module, a source fabric port, a source port, an ingress fabric port, an ingress port, a fabric port, or an input port. Likewise an egress port interface module may be referred to as an egress fabric interface module, a destination fabric port, a destination port, an egress fabric port, an egress port, a fabric port, or an output port.

Figure 2:
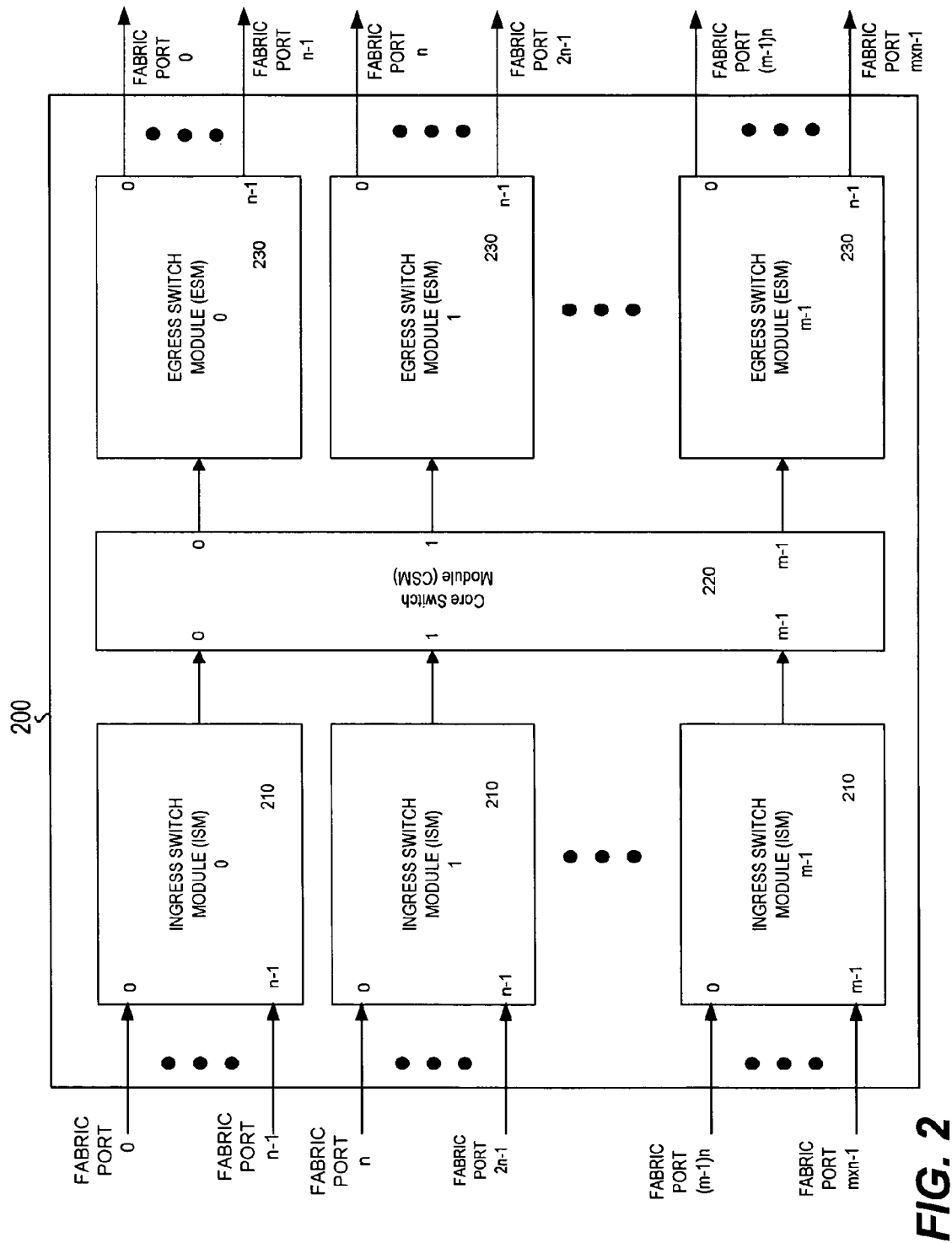
FIG. 2 illustrates an exemplary block diagram of a multi-stage switch fabric, according to one embodiment.

FIG. 2 illustrates an exemplary block diagram of a multi-stage switch fabric 200. The multi-stage switch fabric 200 comprises a three-stage switch fabric having one or more Ingress Switch Modules (ISMs) 210 in the first stage, a Core Switch Module (CSM) 220 in the second stage, and one or more Egress Switch Modules (ESMs) 230 in the third stage. According to one embodiment, the ISMs 210 and the ESMs 230 are electronic switch modules and the CSM 220 is an electronic or optical switch module. In an optical switch, the data path remains optical from an input to an output, allowing very high capacities. According to one embodiment, the optical switch is electrically-controlled, that is, the switching paths are configured by electrical signals. Such a switch behaves logically like an electronic crossbar switch with no internal buffering (sometimes called a "pass-through" crossbar device), except that the data paths are all-optical.

In describing the operation of the multi-stage switch fabric 200, the case of unicast packets, that is, packets that are sent to a single destination port, is considered first. The operation of the switch fabric with respect to multicast packets that need to be replicated to multiple destination ports is described subsequently.

The ISM 210 receives packet streams from the fabric port interface modules on the interface cards (e.g., 150 of FIG. 1), and concentrates the packet streams for switching through the CSM 220. According to one embodiment, the concentrated signal is transmitted in the form of a wavelength-division multiplexed (WDM) optical signal, consisting of multiple optical wavelengths, to the CSM 220 over an optical path (for example, optical fiber). With WDM, many optical signals carrying separate data streams can be transmitted simultaneously over the data path by assigning each signal a different optical wavelength. This enables an optical switch to act as logical equivalent of many parallel electronic crossbar planes, each corresponding to a distinct wavelength.

After undergoing switching in the optical switch, the WDM signal reaches an ESM 230 via another optical path (for example, optical fiber). The ESM 230 separates the channels of the WDM signal, converts them into electronic form, and switches the individual packets to their addressed destination port interface modules.

According to one embodiment, the CSM 220 can comprise an electronic pass-through crossbar. In such an embodiment, a physical electronic crossbar device may replace the optical switching function for each wavelength used to transfer data in the WDM signal. For example, if the WDM signal employs four wavelength channels to pass data, then the CSM electronic switch will have four distinct physical crossbar devices, each switching the data stream associated with one of the wavelengths in the design based on optical switch.

As illustrated, a first stage has m ISMs 210 labeled 0 through m−1 and each ISM 210 has n ports (labeled 0 through n−1 for each ISM 210 and 0 through m×n−1 for the overall multi-stage switch fabric 200). The middle stage CSM 220 is a single m×m optical crossbar switch capable of switching WDM data streams. Each ISM 210 concentrates the data streams from the associated ports into a single WDM stream with n channels. While, in this example, the number of channels is identical to the number of ports associated with each ISM, alternate embodiments may choose the number of channels to be either greater than or less than the number of ports n per ISM. Having a greater number of channels than ports may provide improved throughput and compensate for scheduling inefficiencies while a number of channels less than the number of ports may result in some performance loss.

The ESM 230 de-multiplexes the WDM data stream received from the CSM 220 into its constituent channels and converts the packet streams into electronic signals. The packets from these data streams are then switched through an electronic crossbar to their intended destinations, and delivered to the corresponding port interface module.

Each of the switch modules (ISM 210, CSM 220, ESM 230) may be controlled by a separate scheduler. Each scheduler is responsible for setting up the switching crossbar within the module at frame boundaries based on requests received from its ports. All of the channels within the WDM stream are advantageously switched as a group by the CSM to one of its ports, by selectively routing each wavelength channel to a distinct output is also possible.

Figure 3:
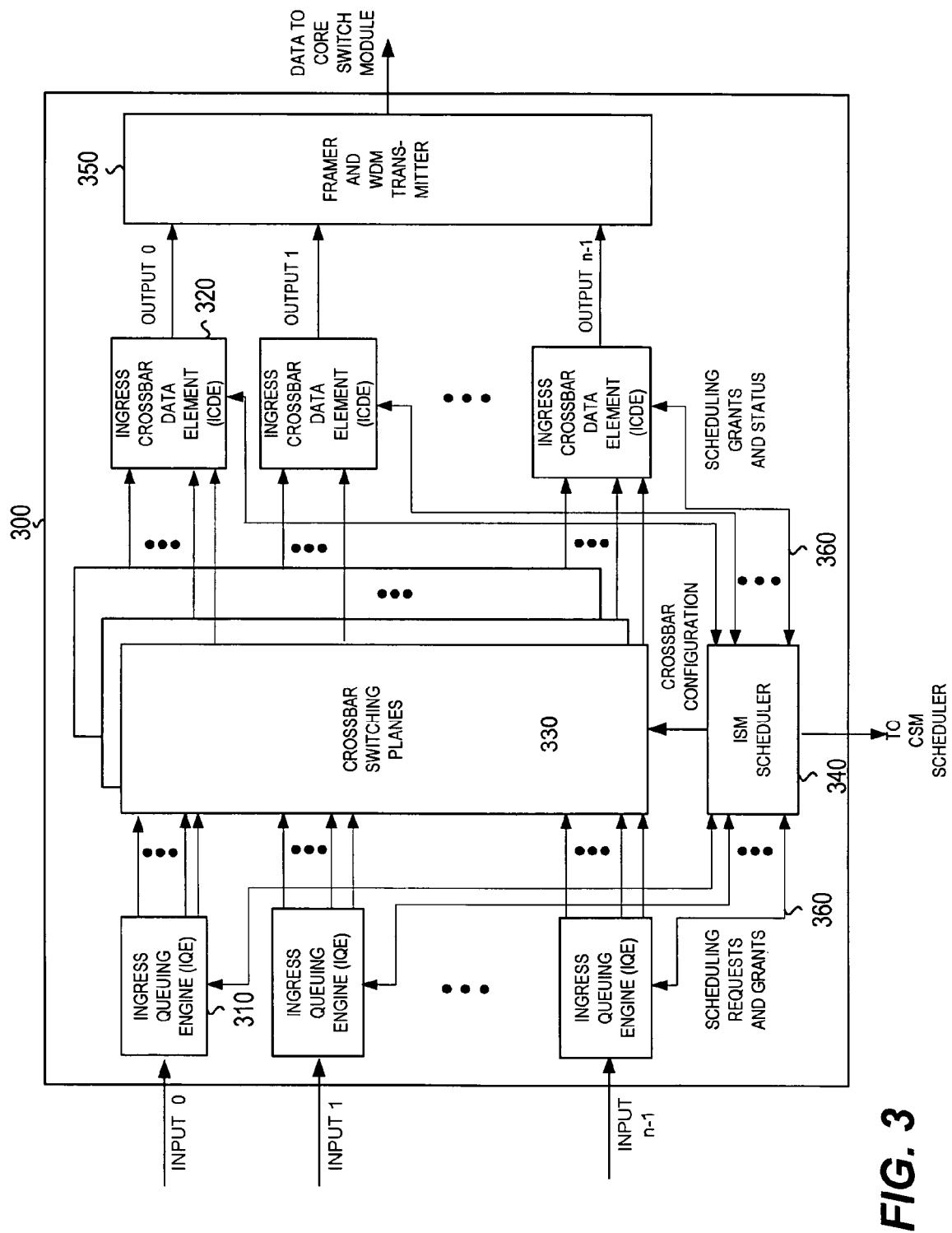
FIG. 3 illustrates an exemplary block diagram of an Ingress Switching Module (ISM), according to one embodiment.

FIG. 3 illustrates an exemplary block diagram of an ISM 300. The ISM 300 includes one Ingress Queuing Engine (IQE) 310 per port, one Ingress Crossbar Data Element (ICDE) 320 per port, crossbar switching plane(s) 330, an ISM scheduler 340, and a framer and WDM transmitter (FWT) 350. The IQE 310 receives data from its corresponding fabric port as variable-size packets. The IQE 310 aggregates the packets into frames (discussed in more detail later) for switching via the crossbar switching planes 330. According to one embodiment, the crossbar switching planes 330 are electronic crossbars. The frames arrive in the ICDE 320 and the packet segments are extracted from the frame. The ICDE 320 receives the packets and re-frames the packets for transmission over the CSM. The FWT 350 then converts the frames formed by the ICDE 320 into optical signals. The frame from each ICDE is at a different wavelength, and the frames are combined to form a WDM signal that is transmitted to the CSM (e.g., 220 of FIG. 2).

The ISM scheduler 340 is connected to the IQEs 310 and the ICDEs 320. According to one embodiment, the IQEs 310 and the ICDEs 320 are connected to the ISM scheduler 340 through a full-duplex path, for example, a pair of serial links 360 (one in each direction). Scheduling requests from the IQEs 310, and the grants sent by the ISM scheduler 340 in response, are sent through these links.

The IQEs 310 store the packets arriving from the interface cards in a set of queues. Each IQE 310 maintains a separate queue (isolated from each other) for packets destined to each ICDE 320. In addition, the packets destined to a specific ICDE 320 can further be distributed into multiple queues based on their class of service or relative priority level. These queues may be referred to as virtual output queues. The packets may be broken down into segments and the segments stored in the queues. The segments can be variable size but are limited to a maximum size.

Figure 4:
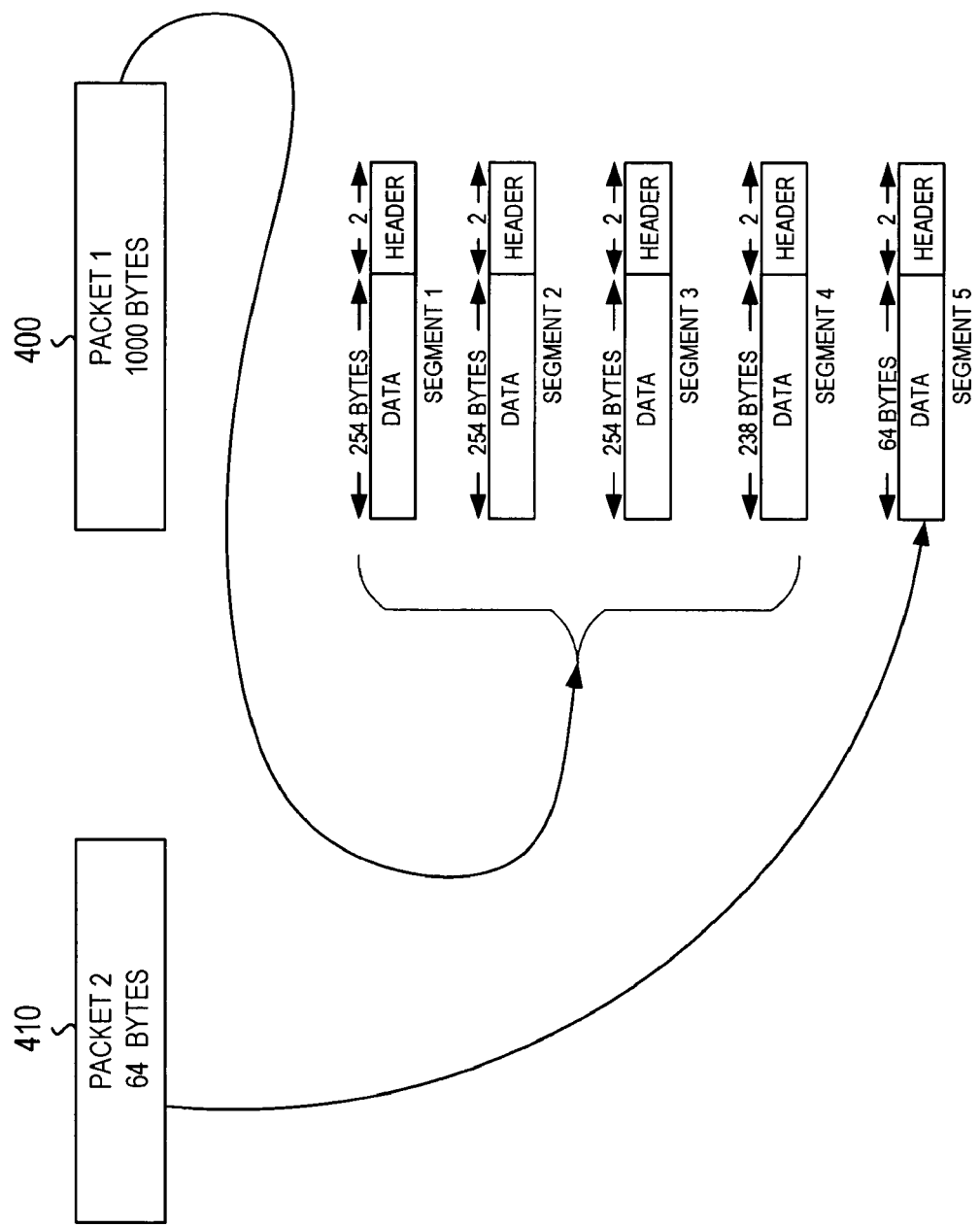
FIG. 4 illustrates an exemplary distribution of packets being stored as segments in a single queue, according to one embodiment.

FIG. 4 illustrates an exemplary distribution of packets being stored as segments in a single queue (corresponding to specific destination port and priority level) within an ingress fabric interface module. A segment header identifies the queue in which the segment is to be placed upon its arrival in the egress fabric interface module. The number of queues is dependent on number of priority levels (or class of services) associated with the packet. Furthermore, the number of queues may also be dependent on number of ingress fabric interface modules that can send data to the egress fabric interface module.

Figure 5:
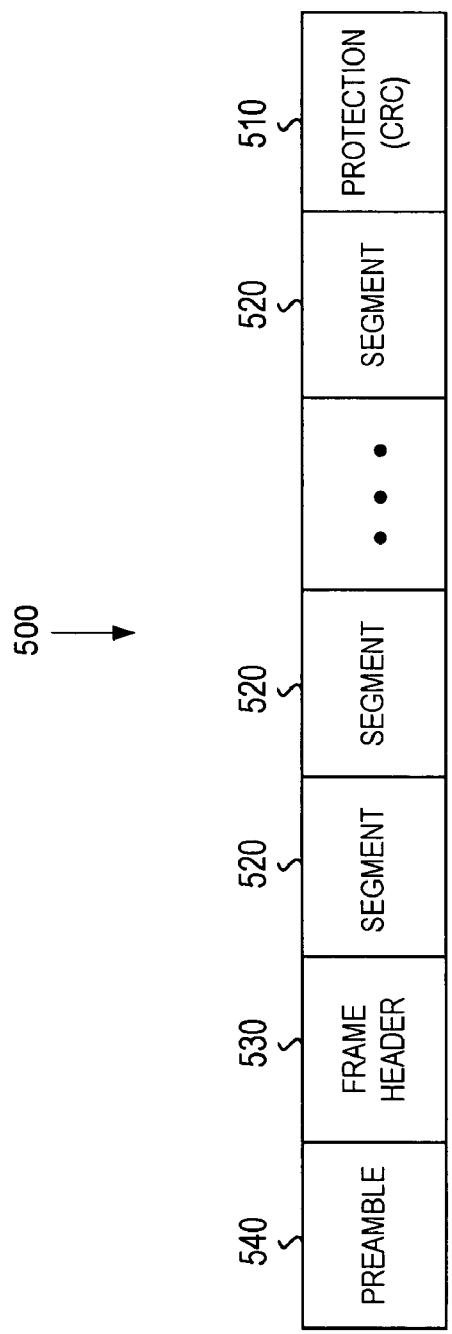
FIG. 5 illustrates an exemplary format of a frame made up of multiple segments, according to one embodiment.

The segments stored in the queues are aggregated into frames by an IQE (e.g., 310 of FIG. 3) before transmission to a crossbar matrix (e.g., 330 of FIG. 3). FIG. 5 illustrates an exemplary format of a frame 500 (made up of multiple segments) being transmitted by an IQE to an ICDE via the crossbar matrix. The frame 500 starts with a preamble 540, frame header 530, followed by one or more segments 520, and a protection/error detection field 510 (e.g., a Cyclic Redundancy Code (CRC)). The frame header 530 contains fields identifying the ingress and egress fabric interface modules associated with the frame, and other optional information. The preamble 540 is for establishing synchronization at the ICDE. The maximum size of the frame is a design parameter. The time taken to transmit the maximum-size frame is referred to as the "frame period." This interval is the same as a scheduling interval for the ISM scheduler (discussed in further detail later). The frames transmitted in ISMs will be referred to as "ISM frames" to distinguish from frames transmitted in the ESMs or CSM.

The IQE constructs a frame by de-queuing one or more segments from its queues when instructed to do so by a grant from the ISM scheduler. Such a grant arrives at each IQE during each frame period. On receiving the grant, the scheduler first identifies the subset of queues from which data need to be de-queued, based on the destination fabric port number specified by the grant. If there are multiple queues associated with the specific destination, the ingress module chooses one or more queues from this subset based on a scheduling discipline. For example, if each of the queues in the subset corresponds to a distinct priority level, then the queues may be serviced in the order of priorities, starting from the highest priority queue, and proceeding to the next priority level when the current priority level queue is empty. This de-queuing of segments proceeds until the frame is full. Each frame so constructed may not have the same size, but will always be within the maximum size specified.

While constructing the frame, the segments from multiple packets may be interleaved within a frame. Because the segment header provides identifying information for re-assembling the segments into the original packets, data integrity is maintained. It is advantageous that the order of segments from the same packet be preserved.

When there is only a single crossbar switching plane present within the ISM, the frame is transmitted in bit-serial fashion through the crossbar plane. When multiple crossbar planes are used, the contents of the frame are striped over the available crossbar planes. Striping may be performed at the bit, byte, or word level. Additional channels may be used for protection, such as error detection and correction.

The frame period of the ISM frame can be chosen independent of the maximum packet size in the system. According to one embodiment, the frame period is chosen such that a frame can carry several maximum-size segments and is compatible with the reconfiguration time of the crossbar data path.

It is advantageous to consider the overhead in synchronizing the receivers in the ICDE with the data streams at the start of a frame when selecting the frame period. A data stream is broken at the end of a frame. A new frame arriving at the ICDE may be from a different IQE, resulting in a change in frequency and/or phase of the clock associated with the data stream. Thus, the receivers must re-establish synchronization at the boundary of every frame. Toward this end, the preamble 540 is positioned at the beginning of each frame 500. The preamble 540 does not carry any data, but only serves to establish synchronization.

Referring back to FIG. 3, the ICDE 320 receives the framed segments from the crossbar planes 330, de-frames the segments and queues the segments based on the ESM number of the destination for that segment. For example, if a segment is addressed to fabric port 50, and fabric port 50 is served by the ESM 2, then the ICDE 320 will queue the segment in its queue number 2. When data is transmitted from the ISM 300 to the CSM (e.g., 220 of FIG. 2), the data is framed by the FWT 350 and the FWT 350 transmits the frames from the ICDEs having data to be transmitted as a WDM signal, where the data from each ICDE is transmitted at a different optical wavelength.

As previously noted, the data arriving at the IQEs 310 is segmented and stored in queues based on destination port and priority level. During each cycle of the frame clock, each of the IQEs 310 transmits information on the segments waiting in its queues to the ISM scheduler 340. This information can be regarded as a set of requests from the IQEs for use of the data path to the crossbar 330. The information provided by each IQE consists of, at a minimum, the addresses of the destination ESM associated with its non-empty queues. The information can optionally include many other attributes, such as the total amount of data queued for each ESM, the "age" of each request (that is, the time interval since data was last transmitted to the specific ESM), and priority levels. The scheduling requests sent from the IQEs to the ISM scheduler during each frame period may be formatted in the form of a request frame.

Figure 6:
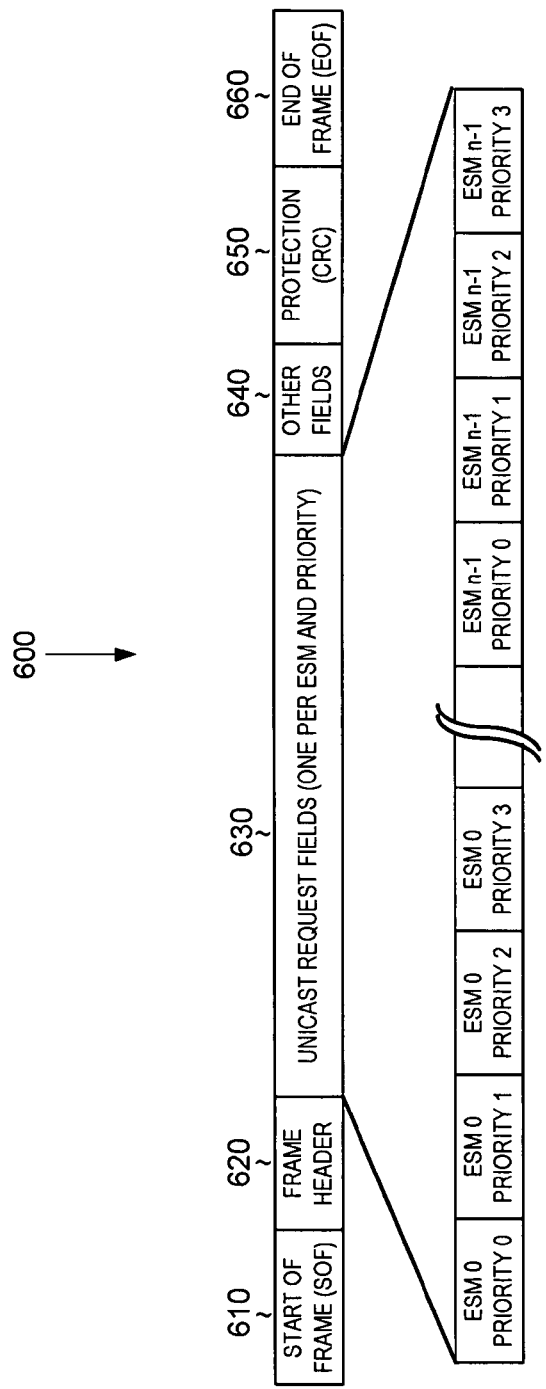
FIG. 6 illustrates an exemplary ISM request frame, according to one embodiment.

FIG. 6 illustrates an exemplary request frame 600 sent by the IQE to the ISM scheduler. The request frame 600 includes a start of frame (SOF) delimiter 610, a header 620, request fields (requests) 630, other fields 640, an error detection/correction field 650 (e.g., CRC), and an end of frame (EOF) delimiter 660. Frames with bad CRC are discarded by the scheduler. Because these requests will automatically be repeated during the following frame periods (requests include total data in queue at time of request which does not include data that has been requested and granted but not yet de-queued—discussed in detail below) no retransmission protocol is required. The other fields 640 may be used for functions such as flow control and error control.

The major part of the request frame 600 is the set of requests 630. According to one embodiment, there is one request for each ESM and priority level. Assuming an example system with 64 ESMs and 4 priority levels, there would be 256 (64 ESMs×4 priorities/ESM) distinct requests 630 in the request frame 600. The requests 630 indicate that there is data in an associated queue available for transmission. The request 630 may summarize the amount of data in the associated queue. The length of the requests 630 (e.g., number of bits) may be chosen taking into account limitations on the total length of the request frame 600, and the granularity of the amount of data in the associated queue needed by the scheduler (scheduling algorithms). For example, the requests 630 may be encoded as 4 bits, thus providing 16 different options for defining the amount of data in the queue. That is, the request 630 can utilize 4 bits to describe the amount of data in the queue. The requests 630 can be encoded in various ways to define the amount of data in the associated queue.

The amount of data in the queue may be described in terms of number of bytes, packets, segments or frames. A packet-based switch fabric could define the amount of data in terms of bytes or packets. A segment-based switch fabric could define the amount of data in terms of bytes, packets, or segments. A frame-based switch fabric could define the amount of data in terms of bytes, packets, segments, or frames. According to one embodiment for a frame-based switch fabric, the amount of data is quantized in terms of the frame period. That is, the request 630 may be encoded to indicate the number of data frames it would take to transport the data within the associated queue over the crossbar planes.

FIG. 7 illustrates an exemplary encoding scheme for quantizing the amount of data based on frames. As illustrated, the scheme identifies the amount of data based on ¼ frames.

According to one embodiment, the ISM scheduler may base scheduling decisions primarily on the priority of the requests. In order to maintain high throughput, the ISM scheduler may also give preference to the amount of data in the queues (e.g., giving preference to queues having full frames worth of data to send). When the amount of data for a specific ICDE and priority is equal, the ISM scheduler may consider the total amount of data queued for the ICDE in making scheduling decisions. The ISM scheduler may also consider the "age" of a request (that is, the number of consecutive cycles during which a request has been pending with no grants given during that time) in making scheduling decisions, so as to prevent starvation for those requests.

Referring back to FIG. 3, because all the ICDEs 320 in an ISM 300 are connected to the same ESM during a frame time of the CSM, the data destined to any ESM can be sent to any of the ICDEs 320 in the ISM 300. The ISM scheduler 340 is responsible for assigning the ICDE 320 destinations for a set of requests received from the IQEs 310 during a given cycle. One constraint on the ISM scheduler 340 in making these assignments is that during a given frame time, each IQE 310 will send data to a distinct ICDE 320. Another constraint is that the scheduler must attempt to perform load-balancing across the ICDEs 320. For maximum efficiency, it is advantageous for a frame worth of data to be transferred between a given ICDE 320 and its corresponding ESM when the CSM permits data transfer during a frame time. This enables full utilization of all the channels in the CSM and can be achieved by the ISM scheduler 340 keeping track of the amount of data stored in each ICDE 320 for each ESM.

Figure 8:
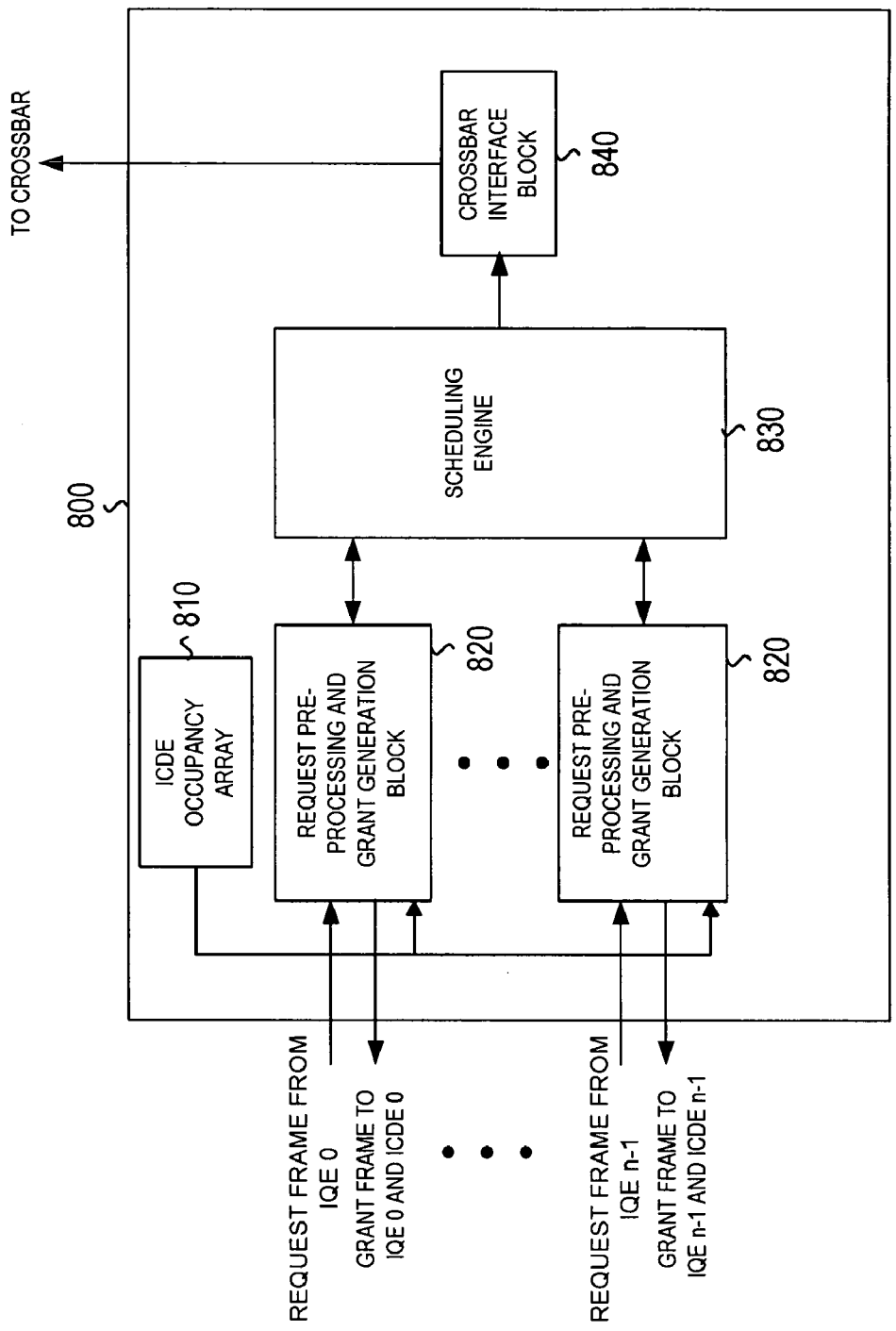
FIG. 8 illustrates an exemplary block diagram of an ISM scheduler, according to one embodiment.

FIG. 8 illustrates an exemplary block diagram of an ISM scheduler 800. The ISM scheduler 800 includes an ICDE occupancy array 810, request pre-processing and grant generation blocks 820, a scheduling engine 830 and a crossbar interface block 840. The ICDE occupancy array 810 has one entry per ICDE per ESM. The ICDE occupancy array 810 facilitates the assignment of ICDEs to the requests from the IQEs. The ICDE occupancy array 810 may be a two-dimensional array indexed by an ICDE address and a destination ESM address. Each entry in the array 810 contains a value representing the amount of data queued in the ICDE for the destination ESM. This value is, at a minimum, a single bit where a value of 0 indicates no data has been queued for the corresponding ESM in the referenced ICDE, and 1 indicating some data has been queued. With more bits, the amount of queued data can be represented more precisely.

The request pre-processing block 820 extracts the requests from request frames received from the IQEs and extracts from each request the ESM index corresponding to the request. The requests may then be passed on to the scheduling engine 830, along with the occupancy values read out from the ICDE occupancy array 810 corresponding to the destination ESM. Eligibility bits are used as "enable" bits during scheduling. That is, if a bit is zero, the corresponding ICDE is not considered for scheduling. After discarding the occupancy values corresponding to these ICDE positions, the scheduler examines the remaining occupancy values to select one of them to assign to the given request. The scheduling engine may utilize several criteria to make this selection. In one embodiment, the scheduling engine 830 may select the ICDE with the smallest occupancy value from the eligible ICDEs. However, because requests arriving from all the IQEs are processed in parallel, the scheduling engine 830 must also arbitrate among the requests so that each IQE is assigned a different ICDE. This may make it difficult to perform the selection based on the smallest occupancy value. In another embodiment, a weighted matching of the ICDEs is performed, such that smaller occupancy values are preferred over larger ones while performing the matching.

Maintaining the ICDE occupancy values in the ISM scheduler is advantageous for improved load balancing while switching through the CSM. Thus, this occupancy information is transferred to the CSM scheduler during each frame time. The CSM scheduler can then take into account how many ICDEs have data queued for a given ESM before scheduling the CSM. Ideally, the CSM scheduler should connect an ISM to an ESM when each of the ICDEs associated with the ISM has a full Frame Slice worth of data to send to the ESM.

After performing the ICDE assignments, the scheduler informs each requesting IQE of the address of the assigned ICDE. Each of the requesting IQEs, on receiving the grant message, de-queues the segments from its queues corresponding to the destination ESM specified by the request, and transmits them over the crossbar planes as a frame to the specified ICDE.

In parallel with transmitting the grant messages to the IQEs, the crossbar interface block 840 sets up the crossbar planes to establish the data paths between the IQE and ICDE devices as per the assignment computed.

The scheduling engine 830 also sends a corresponding grant message to each of the ICDEs selected as destinations in the current assignment. This enables the receiving ICDEs to detect any errors in the setting of the crossbar planes that cause data to be delivered to an incorrect ICDE.

The scheduling engine 830 may perform multiple iterations to match the requesting IQEs with the eligible ICDEs, where a subset of the matching is completed in each iteration. As IQEs and ICDEs are matched, the matched IQEs and ICDEs are removed from the computation, so that only the remaining IQEs and IC DEs are considered in the following iterations. The iterations proceed until all requesting IQEs have been matched, or if no more IQE-ICDE pairs can be matched, or if a certain upper limit on the number of iterations has been reached.

Upon completion of the computation of the matching, the ISM scheduler 800 sends the result to each requesting IQE as a grant message. In one embodiment, grant messages are sent by the ISM scheduler 800 to the IQEs and to the ICDEs by encapsulating them within grant frames. If the IQE and ICDEs corresponding to the same index are packaged together (within the same chip, for example) the grant messages to the IQE and to the ICDE at the same address are sent in the same frame. The message to the IQE identifies the destination ICDE and the message to the ICDE identifies the source IQE.

Figure 9:
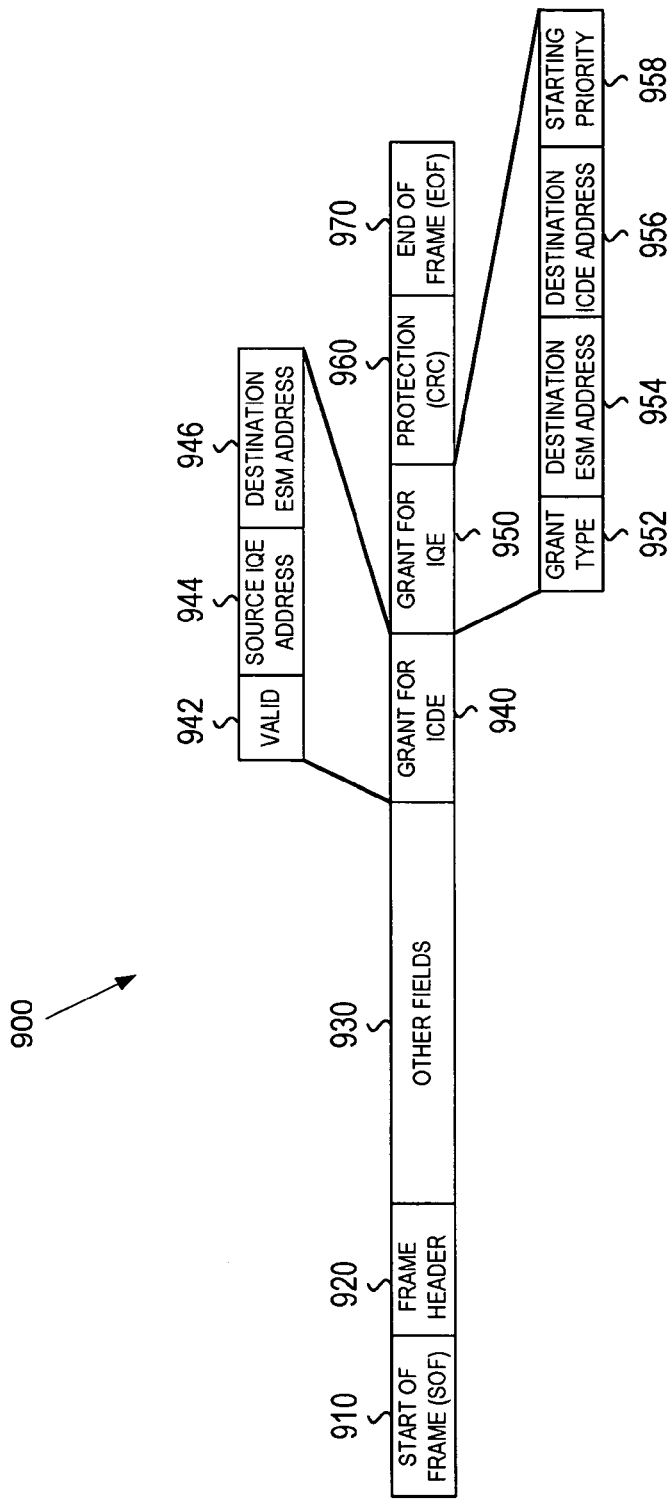
FIG. 9 illustrates an exemplary ISM grant frame, according to one embodiment.

FIG. 9 illustrates an exemplary grant frame 900, combining the grant messages to the IQE and the ICDE associated with a fabric port. The grant frame 900 includes a start of frame (SOF) delimiter 910, a frame header 920, other fields 930, an ICDE grant 940, an IQE grant 950, an error detection/correction field 960 (e.g. CRC), and an end of frame (EOF) delimiter 970. The other fields 930 can be used for communicating other information to the IQEs and the ICDEs, such as flow control status. The error detection/correction field 960 (e.g., a Cyclic Redundancy Code (CRC)) is used to detect errors in the grant frame.

The ICDE grant 940 may include a valid bit 942, a source IQE address 944, and a destination ESM address 946. The valid bit 942 indicates that the field is valid. The source IQE address 944 represents the IQE that the ICDE should be receiving data from. The destination ESM address 946 specifies the address of the ESM associated with the destination port for the data. This field 946 is used by the ICDE to identify the queue in which the incoming data is to be inserted.

The IQE grant 950 may include a grant type 952, a destination ESM address 954, a destination ICDE address 956 and a starting priority 958. The grant type 952 specifies the type of grant. Exemplary types of grants may include no grant (meaning no grant is indicated in frame), unicast grant (meaning that the IQE should dequeue from unicast queues), and multicast grant (described later). The destination ESM address 954 specifies the address of the ESM associated with the destination port for the data. This field is used by the IQE to identify the queue or set of queues to de-queue data from. The destination ICDE address 956 specifies the address of the ICDE to which data is to be transmitted during the next frame period. The starting priority 958 specifies the starting priority level for dequeuing unicast data. The starting priority 958 enables the scheduler to force the IQE to start de-queuing data from a lower priority queue when a higher-priority queue has data (to prevent starvation of lower-priority data).

Figure 10:
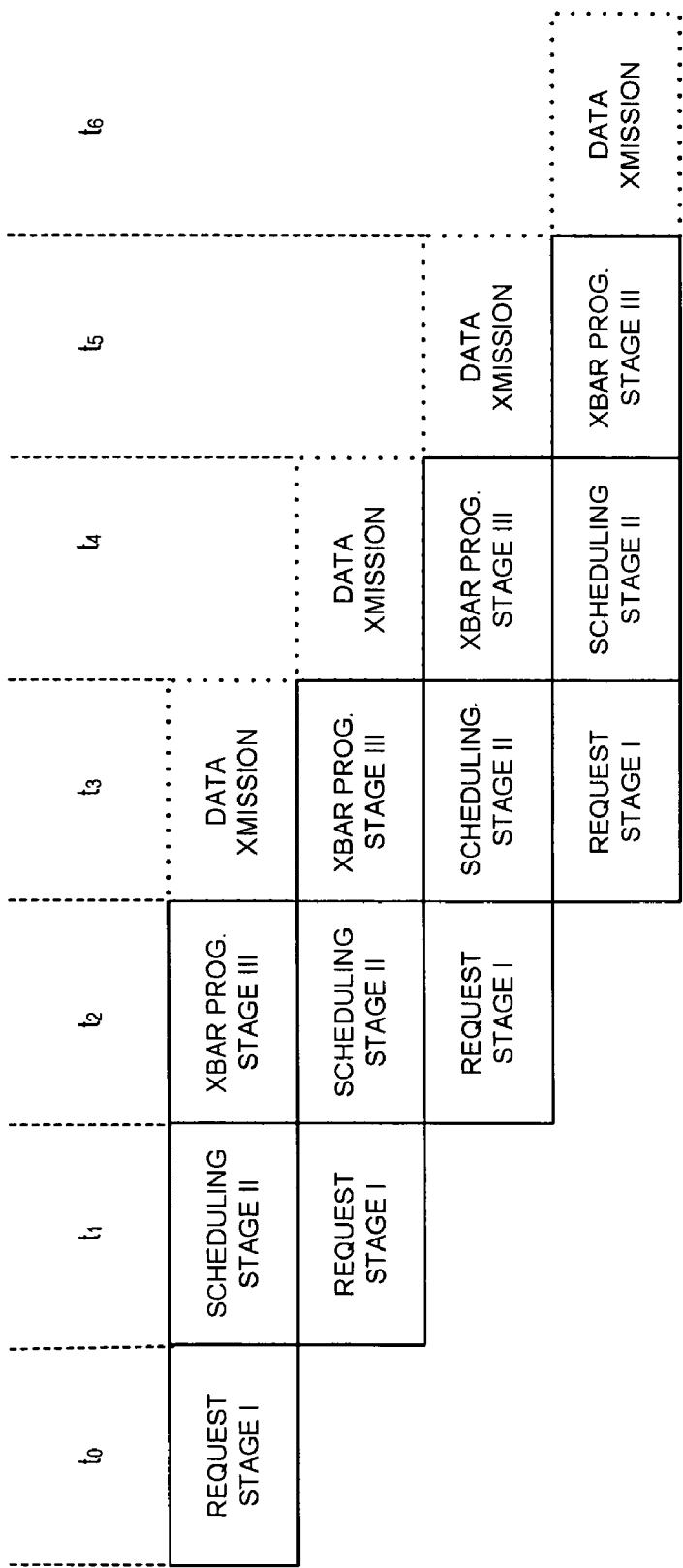
FIG. 10 illustrates an exemplary 4-stage pipeline, according to one embodiment.

According to one embodiment, the various operations associated with the system are pipelined so that they can be overlapped. The basic time unit for system operation is the frame period. Therefore, each pipeline stage may correspond to one frame period, for example. FIG. 10 illustrates an exemplary 4-stage pipeline. The pipeline schedule includes four stages. Stage I is the request stage. During this stage, the IQEs send their requests to the ISM scheduler. The ISM scheduler can perform some pre-processing of the requests in this stage while the requests are being received. Stage II is the schedule stage. During this stage, the ISM scheduler matches the inputs (IQEs) to outputs (ICDEs). At the end of this stage, the scheduler sends a grant message to the IQEs specifying the ICDEs to which it should be sending data. The ISM scheduler may also send the grants to the ICDEs to identify the IQEs from which they are expected to receive data from. Stage III is the crossbar configuration stage. During this stage, the ISM scheduler configures the crossbar planes based on the matching computed during stage II. While the crossbar is being configured, each of the IQEs de-queues data from its queues corresponding to its matched ICDE, and forms a frame. Stage IV is the data transmission stage. During this stage, the IQEs transmit their data frames across the crossbar.

Referring back to FIG. 3, data transmitted out of the ISM 300 into the CSM is also in the form of framed segments, but the size of this frame may be different from that of the ISM frame. In addition, data is transmitted through the CSM as a WDM frame that consists of framed segments from all of the ICDEs 320 within the ISM 300. A set of framed segments transmitted by a specific ICDE 320 during a CSM frame period is referred to herein as a "CSM Frame Slice" and the combination of segments transmitted by all the ICDEs 320 within an ISM during the CSM frame period is referred to herein as a "CSM Frame".

Figure 11:
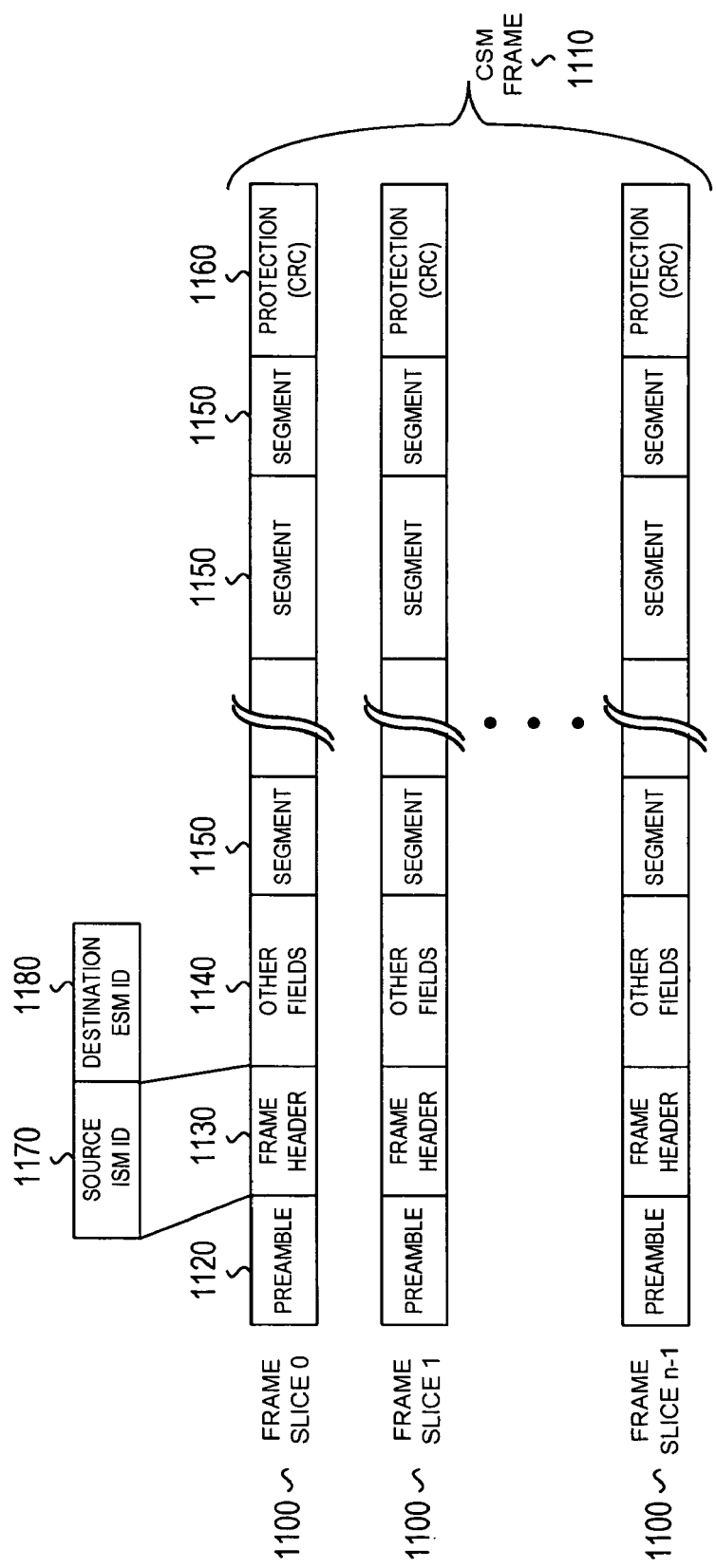
FIG. 11 illustrates exemplary Core Switch Module (CSM) Frame Slices within a CSM Frame, according to one embodiment.

FIG. 11 illustrates exemplary CSM Frame Slices 1100 making up a CSM Frame 1110. As illustrated n frame slices (labeled 0 through n-1) corresponding to the n ICDEs within an ISM make up the CSM Frame 1110. The Frame Slices 1100 making up the CSM Frame 1110 are destined for ports served by a specific ESM. That is, the CSM Frame is being delivered to a specific ESM so all the data being transmitted in the CSM Frame 1110 should be associated with that ESM. Each of the Frame Slices 1100 has a preamble 1120, a header 1130, other fields 1140, a plurality of segments 1150, and a protection field (e.g., CRC) 1160. The preamble 1120 is for synchronization as discussed earlier. The header 1130 includes an identification of the source ISM 1170 and the destination ESM 1180. The other fields 1140 may be used for flow control or other functions. The protection field 1160 may be a CRC for error control.

Figure 12:
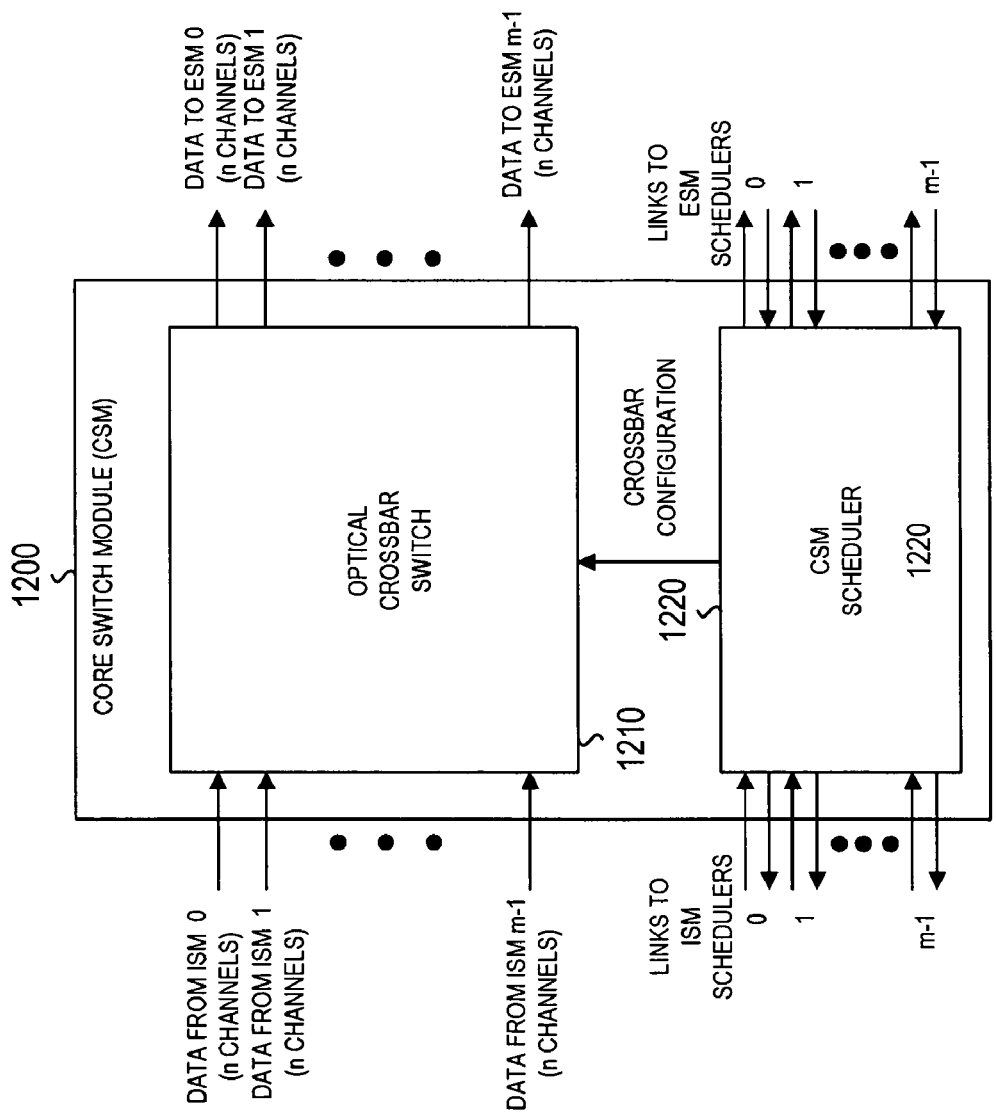
FIG. 12 illustrates an exemplary block diagram of a CSM, according to one embodiment.

FIG. 12 illustrates an exemplary block diagram of a CSM 1200. The CSM 1200 comprises an electrically controlled optical crossbar device 1210 and a CSM scheduler 1220. Electronic crossbar devices may be used in other embodiments. The CSM scheduler 1220, which may be an electronic scheduler, is connected to the ISM schedulers and the ESM schedulers. During each CSM frame period, the CSM scheduler 1220 receives requests from each ISM (through its ISM scheduler) summarizing the amount of data queued for the ESMs. Based on this information, the CSM scheduler 1220 determines the setting of the optical crossbar device 1210 for the frame period. In addition, the computed schedule is also conveyed back to the ISM schedulers (in the form of a grant), which, in turn, set up the ICDEs to de-queue data from the appropriate queues and transmit to the optical crossbar device 1210.

The optical crossbar device 1210 receives data from each of the m ISMs in the system. There are n channels associated with each ISM (e.g., channels numbered channel 0 through channel n-1). The optical cross bar device 1210 switches them together to the same ESM. Thus, during a given frame period, the crossbar may be configured to switch all the channels associated with a particular ISM to a particular ESM. Just as in the case of the ISM scheduling operation, the scheduling operation of the CSM 1200 can be pipelined into a series of stages.

Figure 13:
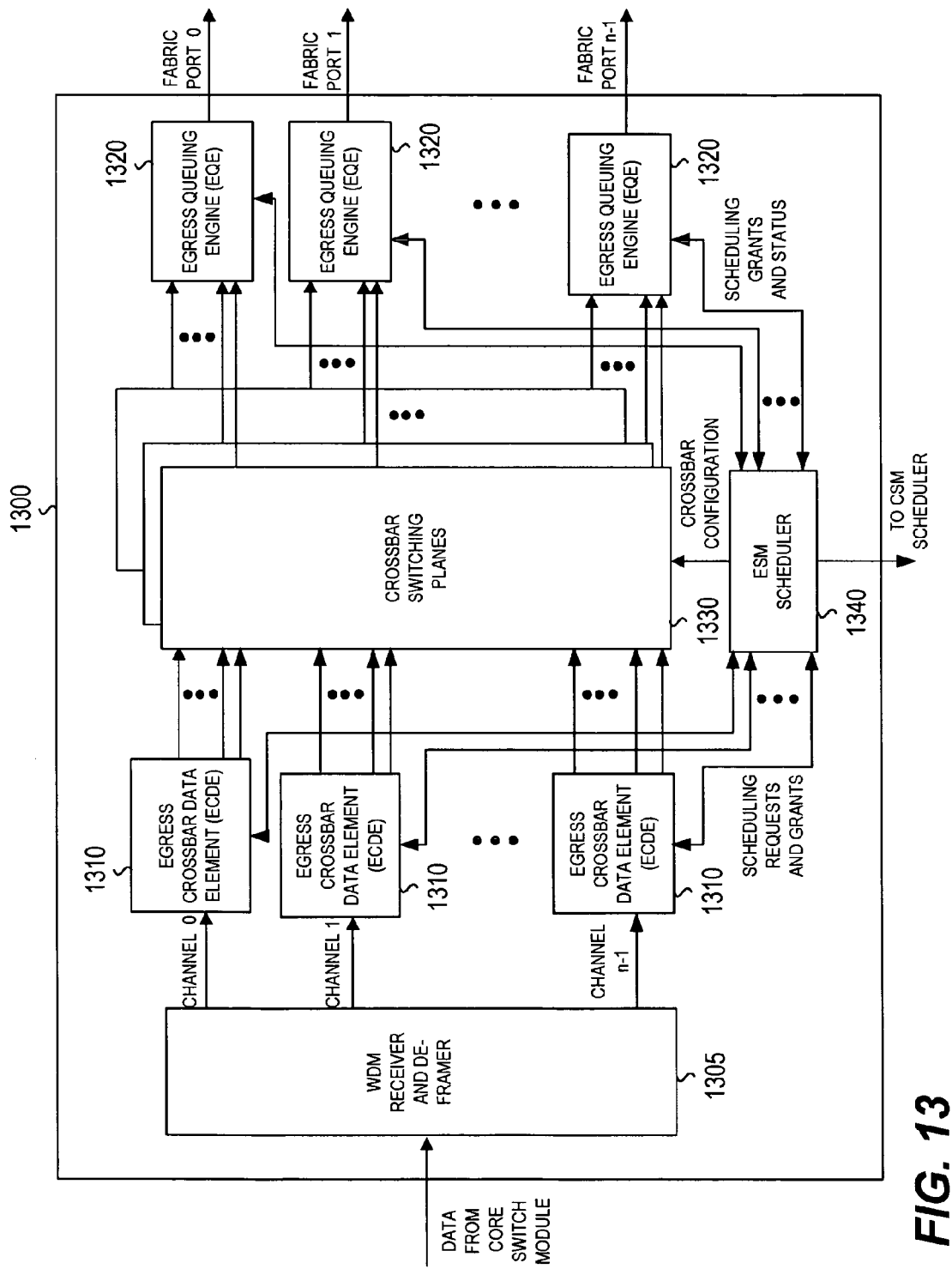
FIG. 13 illustrates an exemplary block diagram of an Egress Switch Module (ESM), according to one embodiment.

FIG. 13 illustrates an exemplary block diagram of an ESM 1300. The ESM 1300 includes a WDM receiver and de-framer (WRF) 1305, a plurality of Egress Crossbar Data Elements (ECDEs) 1310, a plurality of Egress Queuing Engines (EQEs) 1320, crossbar switching plane(s) 1330, and an ESM scheduler 1340. The ECDEs 1310 are ingress queuing devices and the EQEs 1320 are egress queuing devices. Data arrives from the CSM in a WDM frame consisting of multiple framed segments. The individual channels containing the CSM Frame Slices are separated by the WRF 1305. The Frame Slices are then forwarded to the corresponding ECDEs 1310. The ECDE 1310, on receiving a Frame Slice, extracts the packet segments from the frame, and queues them in a set of queues based on the destination fabric port number. In addition, the packets destined to a specific fabric port can further be distributed into multiple queues based on their class of service or relative priority level.

The crossbar switch 1330, which may be an electrical switch and may comprise one or more crossbar switching planes, connects the ECDEs 1310 to the EQEs 1320. This crossbar, in one embodiment, may be identical to that used in ISM, and may have a "pass-through" data path. Information is transmitted over the crossbar planes 1330 as framed segments.

The ESM scheduler 1340 is responsible for setting up the crossbar data paths within the ESM 1300 during each frame time. Each of the ECDEs 1310 transmits information on the segments waiting in its queues to the ESM scheduler 1340 during each frame time. Information transmitted from the ECDEs 1310 to the scheduler 1340 in each frame time can be regarded as a set of requests from the ECDEs 1310 for use of the crossbar datapaths 1330. The requests sent from the ECDE 1310 to the ESM scheduler 1340 during each frame period are formatted as a request frame.

Figure 14:
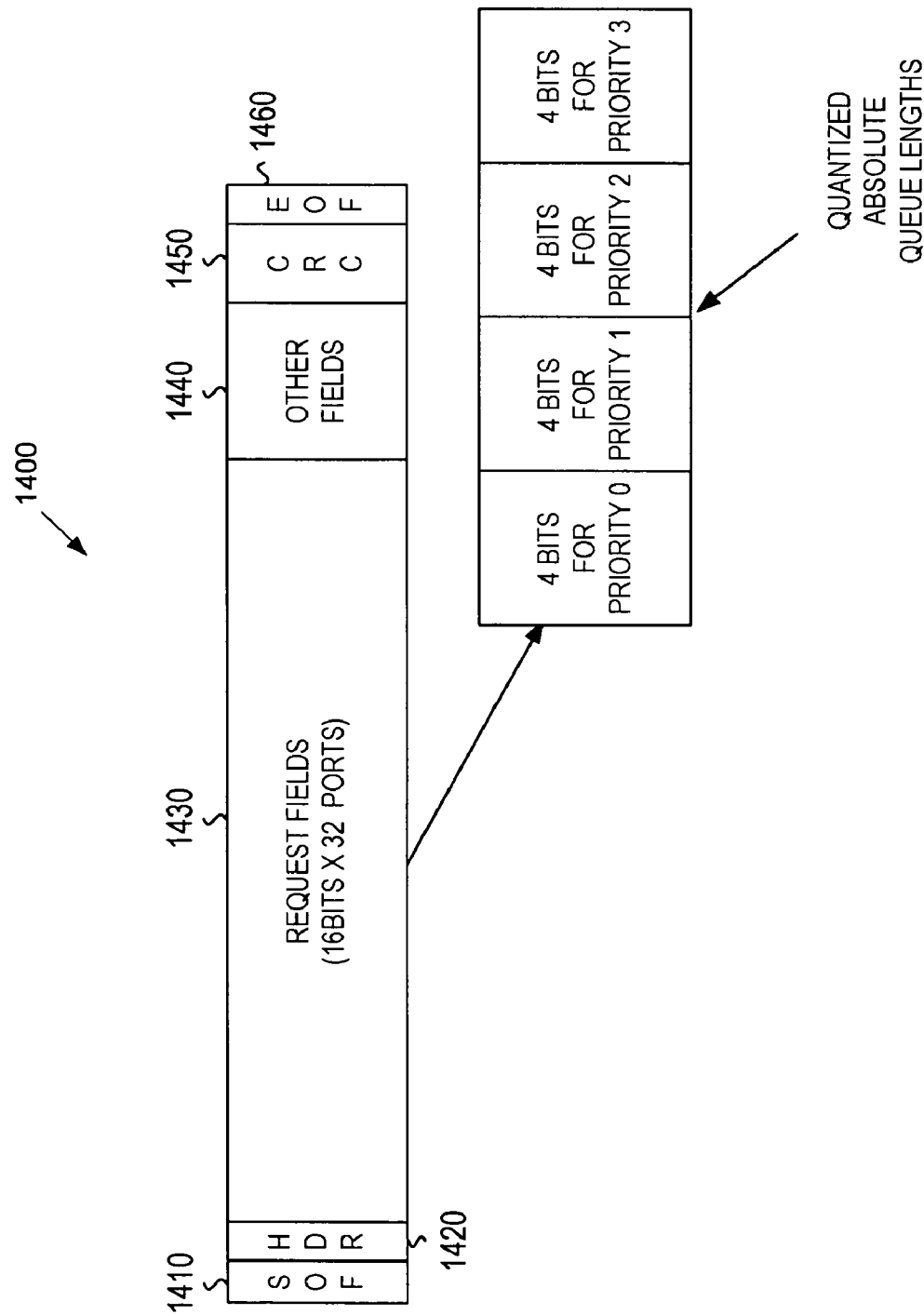
FIG. 14 illustrates an exemplary ESM request frame, according to one embodiment.

FIG. 14 illustrates an exemplary request frame 1400. The request frame 1400 includes start of frame (SOF) delimiter 1410, a header 1420, a plurality of request fields 1430, other fields 1440, a CRC 1450, and an end-of-frame (EOF) delimiter 1460. The request fields 1430 comprise a set of requests, one each for each destination fabric port and priority level. Each request may summarize, for example, the amount of data queued for the corresponding destination port and priority level. The requests may summarize, for example, the amount of data queued for the corresponding destination port and priority level. These length fields can be quantized as explained before with respect to the ISM. The start of frame (SOF) delimiter 1410, the header 1420, the other fields 1440, the CRC 1450, and the end-of-frame (EOF) delimiter 1460 are for the same functions already mentioned.

Referring back to FIG. 13, the ESM scheduler 1340 generates a schedule by performing a matching of the requests received from the ECDEs 1310 and resolving any conflicts between ECDEs 1310. For a given EQE 1320, the scheduler 1340 normally gives preference to ECDEs 1310 having higher priority requests in the matching process. The scheduler 1340 sets the priority of the request to be highest priority data that will be sent as part of the frame. The ESM scheduler 1340 transmits the schedule information in the form of grants to the ECDEs 1310. The grants may also be transmitted to the EQEs 1320. If both the ECDE 1310 and the EQE 1320 for the same index are packaged together (in the same chip or board), these two messages could be combined into a single grant frame.

Figure 15:
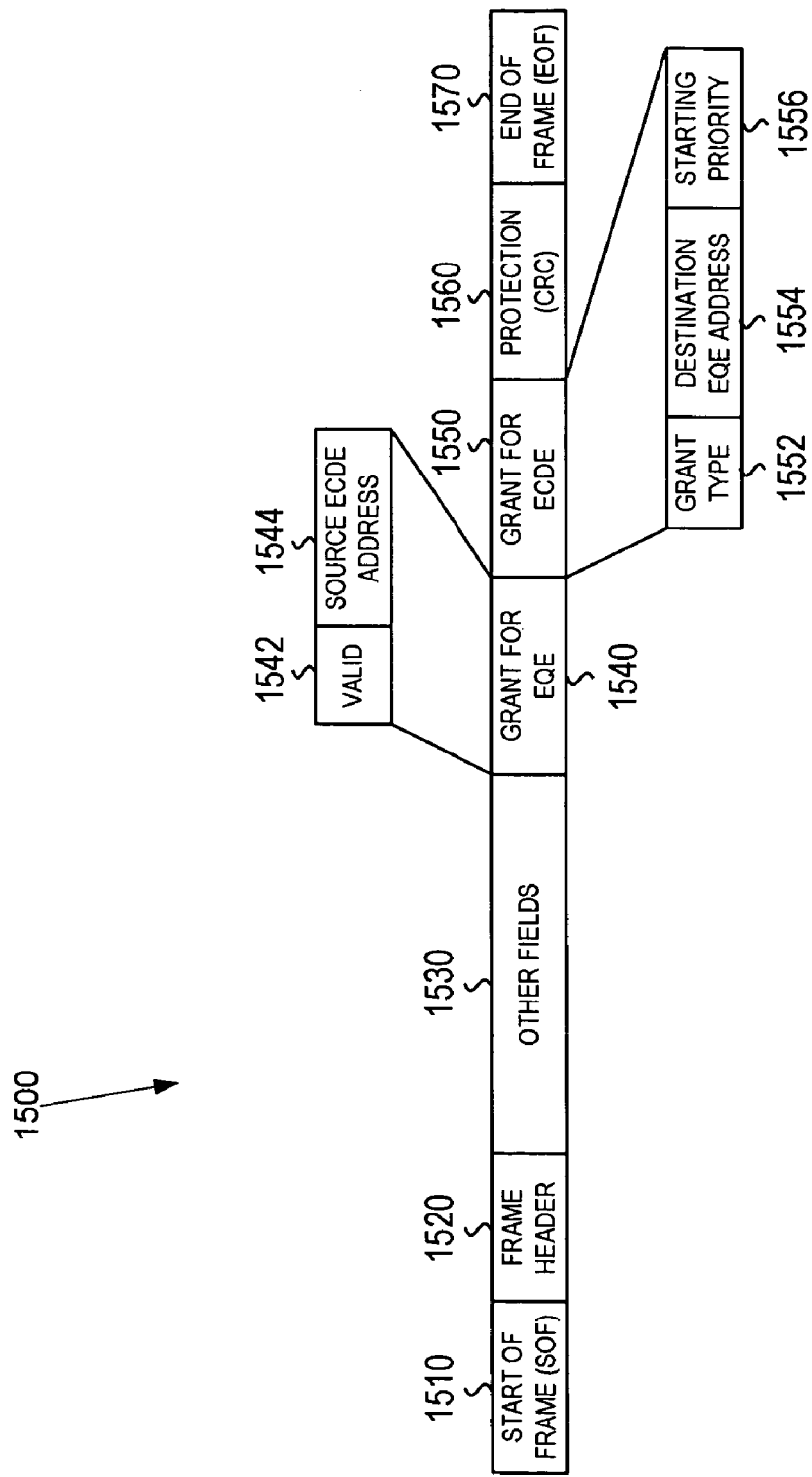
FIG. 15 illustrates an exemplary ESM grant frame, according to one embodiment.

FIG. 15 illustrates an exemplary combined (grants for ECDE and EQE) grant frame 1500. The grant frame 1500 includes a start of frame (SOF) delimiter 1510, a header 1520, other fields 1530, an EQE grant 1540, an ECDE grant 1550, a CRC 1560, and an end-of-frame (EOF) delimiter 1570. The EQE grant 1540 includes a valid bit 1542 (to indicate field is valid) and a source ECDE address 1544 (ECDE that the EQE should be receiving data from). The ECDE grant 1550 includes a grant type 1552 (specifies type of grant), a destination EQE address 1554 (EQE that the ECDE should be sending data to), and a starting priority level 1556 (priority level at which de-queuing should start).

Referring back to FIG. 13, the ESM scheduler 1340 sets the crossbar planes 1330 to correspond to the schedule (grants). Upon receiving the grants, the ECDE 1310 de-queues data from the associated queue(s) and transmits them to the crossbar data planes 1330. The ESM scheduler 1340 can be pipelined into various stages, if desired, as discussed above.

The description of the multi-stage switch fabric so far considered only unicast packets, that is, packets that need to be sent to a single destination port. The case of multicast packets that need to be copied to more than one destination port is considered next.

When multicast packets are received by a store-and-forward device (e.g., switch, router), the store-and-forward device must copy the multicast packets and transmit the multicast packets to destination ports specified in the multicast packets. The header of each multicast packet contains a multicast group identifier (MID). Each MID is associated with a corresponding list of system ports. For example, a MID of 21 may refer to ports 2, 35 and 91. Thus, a multicast packet arriving with a destination MID of 21 must be copied and delivered to each of these three ports. The number of bits in the MID field determines the maximum number of groups that can be formed. For example, with a 16-bit MID, 64K (65,536) distinct multicast groups can be specified. The store-and-forward device utilizes look-up tables to determine the system ports associated with each MID. According to one embodiment, the MID lookup tables and the replication function with a multistage switch are distributed as close to the destination as possible.

Figure 16:
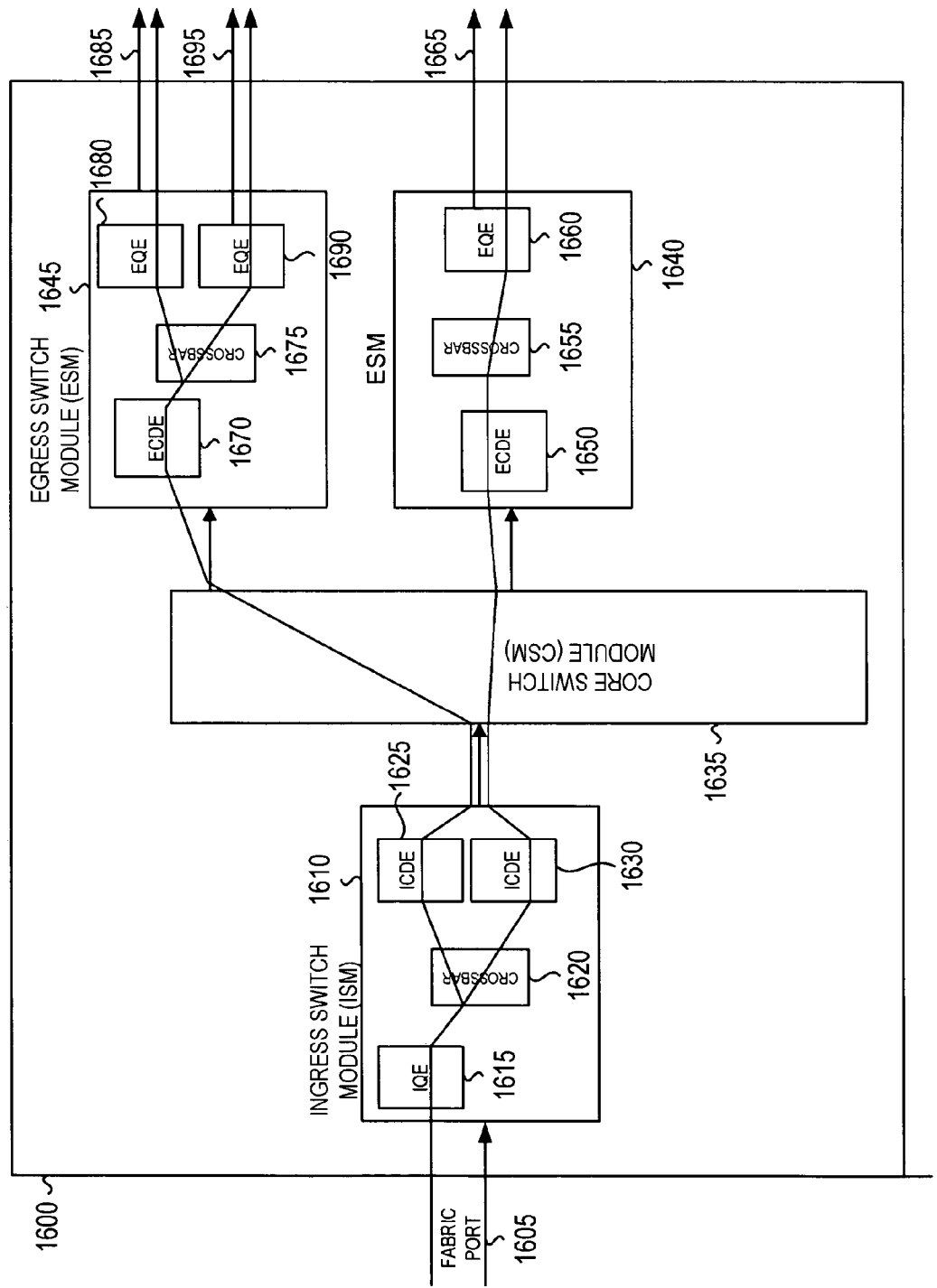
FIG. 16 illustrates an exemplary block diagram of a switching system for transmission of multicast packets, according to one embodiment.

FIG. 16 illustrates an exemplary path of a multicast packet as it is forwarded through a multistage switch fabric 1600. A multicast packet is received at fabric port (input port) 1605 of ISM 1610. The ISM 1610 determines which ESMs the packet is destined for based on the MID. The ISM 1610 makes exactly one copy of the multicast packet for each ESM containing one or more of the desired destination ports of the multicast packet. For example, if a multicast packet is to be delivered to three destination fabric ports and those three destination ports are contained in two separate ESMs (one ESM containing one destination port and a second ESM containing the remaining two destination ports), then the ISM forwarding the packet sends two copies of the packet, one to each of the ESMs containing at least one of the destination ports.

IQE 1615 makes the appropriate number of copies of the packet (two in the illustrative example of FIG. 16) and transmits the packet via crossbar 1620 to ICDEs (multiple ICDEs or a single ICDE). The ICDEs forward copies of multicast packets in the same manner as unicast packets described above (e.g., the multicast packets are aggregated with other packets (unicast, multicast, or both) destined for the same ESM). As illustrated in FIG. 16, the packet is received by two ICDEs 1625, 1630. Each copy of the packet is then transmitted over CSM 1635 to an ESM associated with the destination ports identified in the MID. As illustrated in FIG. 16, the packets are transmitted to ESMs 1640, 1645.

When the packet arrives at the ESMs, the ESMs determine whether the packet is destined for a single destination port or multiple destination ports. If the packet is destined for a single destination port (as with ESM 1640), ECDE 1650 simply forwards the packet via the crossbar 1655 to EQE 1660 associated with fabric port (output port) 1665. If the packet is destined for more than one destination port (as with ESM 1645) a second level replication occurs within ECDE 1670. A separate copy of the packet is then delivered via crossbar 1675 to EQEs 1680 and 1690, associated with fabric ports (output ports) 1685 and 1695, respectively. The transfer of the packet from the ECDE 1670 to each of the EQEs 1680 and 1690 proceeds in an identical manner as for unicast packets, described above (e.g., the multicast packets are aggregated with other packets (unicast, multicast, or both) destined for the same destination port).

Figure 17:
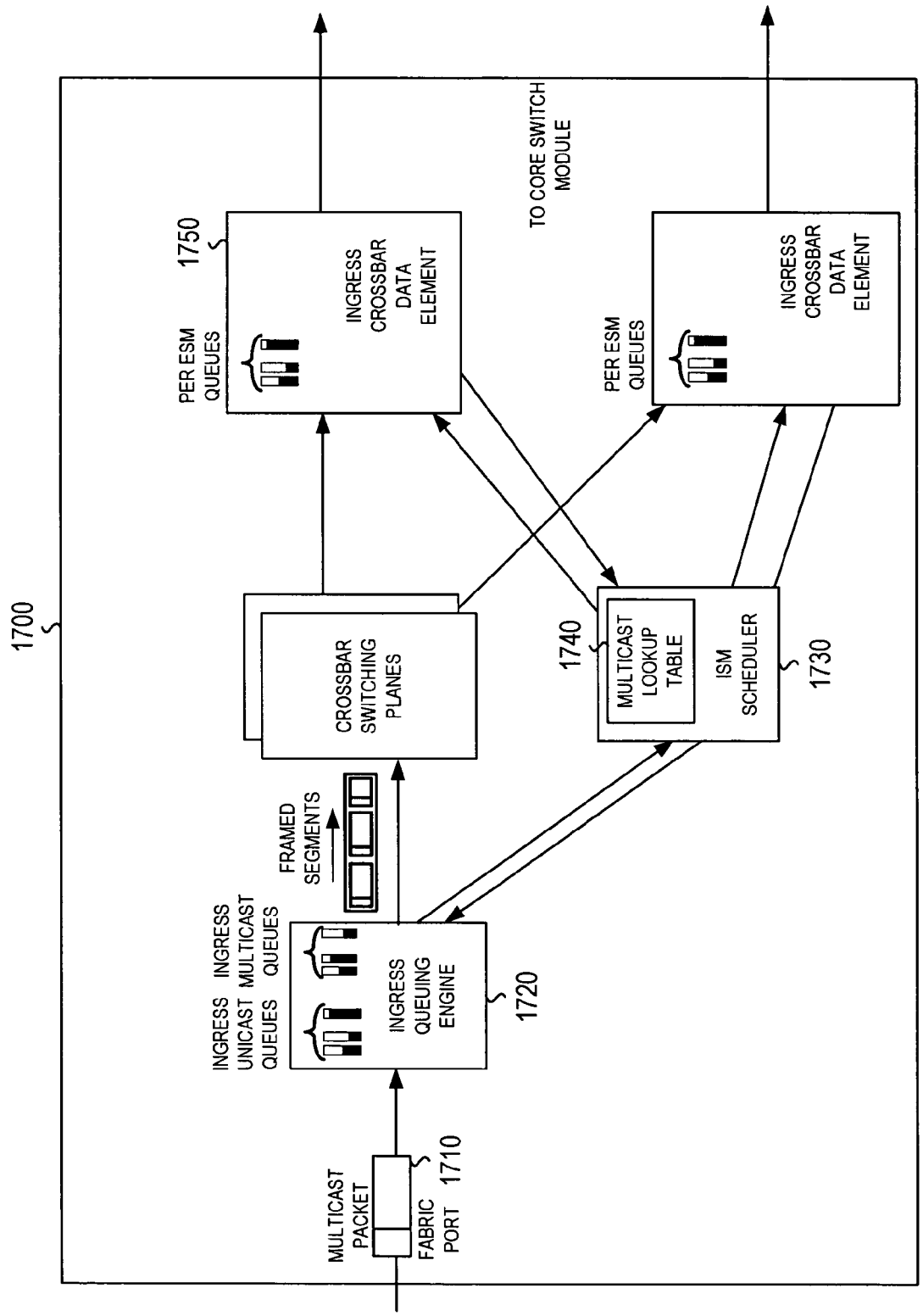
FIG. 17 illustrates an exemplary block diagram of an ISM for transmission of multicast packets, according to one embodiment.

FIG. 17 illustrates an exemplary operation of ISM 1700 with respect to handling multicast data. Multicast data 1710 arrives at IQE 1720 and is segmented and stored in an associated queue. The resulting segments carry the MID in their header, in lieu of the destination port address of unicast segments. The multicast segments can all be stored in a single queue dedicated to multicast packets, or can be distributed among several queues based on their MID and level of priority. In one embodiment, a single queue is used for all multicast packets. The segments from a given multicast packet are all stored sequentially in a queue, without being interleaved with segments from other multicast packets. Likewise, while dequeueing from a multicast queue, a packet is removed from the queue completely before attempting to dequeue the next packet.

Figure 18:
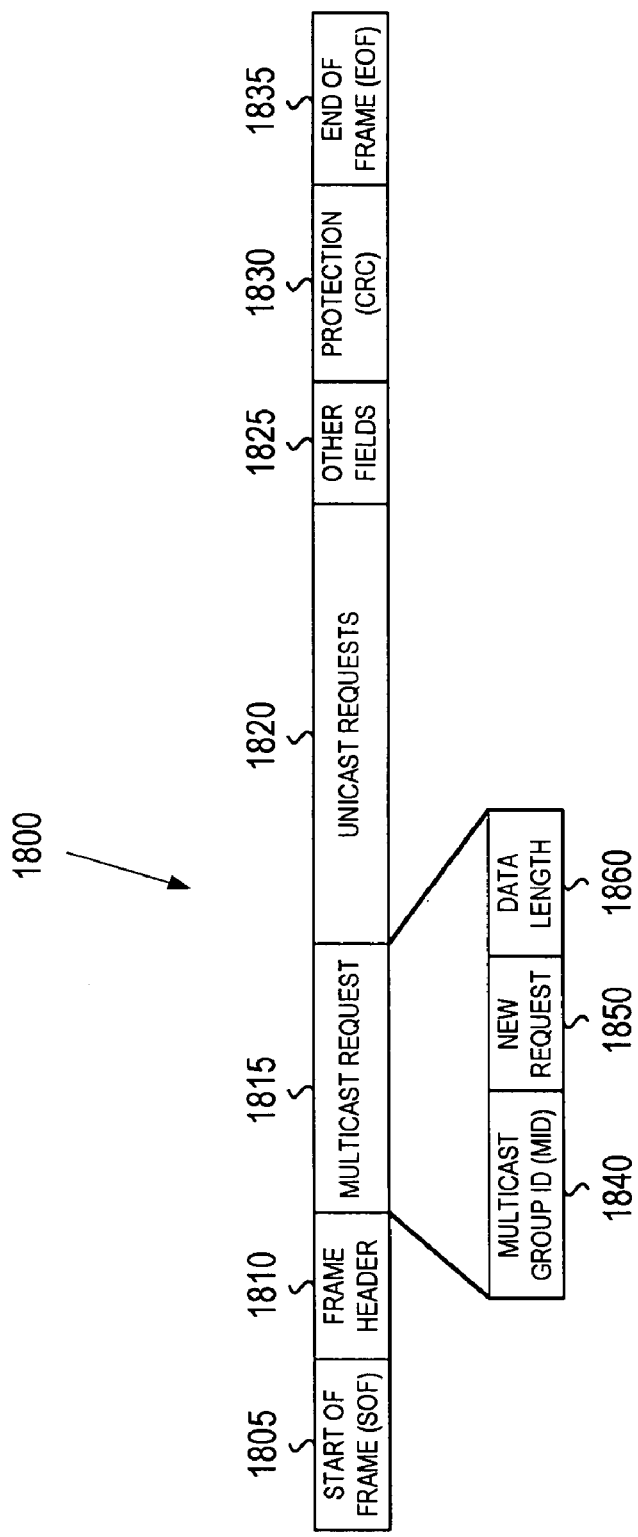
FIG. 18 illustrates an exemplary ISM request frame for a multicast packet, according to one embodiment.

During each frame time, the IQE 1720 transmits requests to an ISM scheduler 1730. The requests can be for unicast packets and multicast packets. The requests are transmitted in the form of request frames. FIG. 18 illustrates an exemplary request frame 1800 having requests for unicast and multicast packets. The request frame 1800 includes a start of frame field 1805, a frame header 1810, a multicast request field 1815, a unicast request field 1820, other fields 1825, a protection field (such as a CRC) 1830, and an end of frame field 1835. The multicast request field 1915 includes a Multicast Group Identifier (MID) 1840, a New Multicast Request (NMR) 1850, and a Data Length (DL) 1860.

The MID 1840 identifies the multicast group associated with the segment at the head of the multicast queue in the requesting IQE. The MID is used by the scheduler to look up the associated ESM bitmap and other information from a multicast lookup table (the lookup table will be discussed in more detail later).

The DL 1860 indicates the amount of data queued in the multicast queue of the IQE. The length information can be encoded in various ways. One approach is to quantize it in terms of the frame period just as for unicast requests, as discussed above with reference to FIG. 7.

The NMR 1850 is a single bit that indicates whether the IQE sending the request has received any multicast grants from the scheduler for transmitting the multicast segments it is requesting for. According to one embodiment, the IQE activates (e.g., set to '1') the NMR 1850 bit while sending a multicast request to the ISM scheduler. The IQE deactivates (sets to '0') the NMR 1850 once a multicast grant is received for the current MID it is requesting for. After receiving the first grant, the IQE may repeat the same request to the scheduler in subsequent frame periods if it is performing replication, so that a new copy of the segments can be transmitted for every grant received. The NMR 1850 bit is deactivated for the subsequent requests after the first grant is received, until the IQE has completed transmitting all the required copies of the segments. Once the last multicast grant for a MID is received, the IQE again activates the NMR 1850 bit in a new request.

The NMR 1850 is used for error detection and recovery. For example, if a last multicast grant message for a particular MID is lost and the scheduler receives a new request for the same MID in the next request message, the scheduler will be able to determine there was an error in receipt of the grant if the request still has the NMR bit deactivated. Upon detecting the error the scheduler can instruct the requesting IQE to flush the segments involved to recover from the error.

Referring back to FIG. 17, the ISM scheduler 1730 uses a multicast lookup table 1740, maintained in memory (e.g., RAM), to determine the ESMs associated with the multicast group. According to one embodiment, for each MID the multicast lookup table 1740 includes a bitmap of size m (where m is the number of ESMs in the system). A bit in the m-bit bitmap is set if one or more ports associated with the corresponding ESM are intended recipients of the packet.

Figure 19:
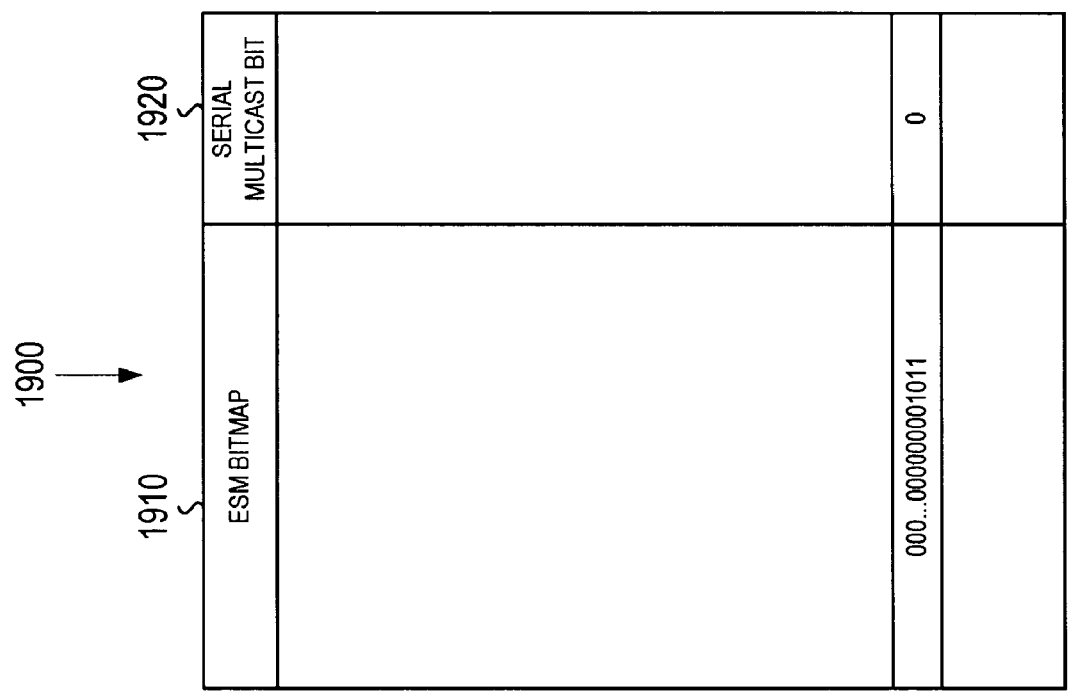
FIG. 19 illustrates an exemplary multicast lookup table, according to one embodiment.

FIG. 19 illustrates an exemplary multicast lookup table 1900. The multicast table 1900 is indexed by MID (identifying the multicast address). The multicast table 1900 includes an ESM bitmap 1910 and a serial multicast bit 1930 (to be discussed later) for each MID. As illustrated, for multicast address 27 (MID 1011 in an embodiment having a 5 bit MID) the associated ESM bitmap 1910 has the bits associated with ESM locations 0, 1 and 3 are set to 1, and all other bits set to 0. This indicates that the multicast packet having MID 27 will be transmitted to ESMs at locations 0, 1 and 3, and also indicates that the multicast packet will be replicated by the IQE and three separate copies will be transmitted, one to each of the three destination ESMs.

The IQE in which segments of the multicast packet are queued, is responsible for replication of the multicast data at the ISM-level. That is, the IQE will deliver a separate copy of the data for each ESM to the ICDEs (as previously mentioned a single ICDE or multiple ICDEs). The replication function can be accomplished by serial replication or spatial replication. According to one embodiment, the system may select between the two replication functions. For example, the serial multicast bit 1920 in the multicast lookup table 1900 stored with the scheduler may be used to either select or de-select serial replication (discussed in detail later) for the specific MID.

Serial replication is useful when the crossbar planes do not have the replication capability (do not have the ability to connect more than one of their outputs to the same input). In serial replication, the IQE performs the replication of multicast segments by explicitly copying them to each of the intended destination ICDEs one at a time. When the serial replication is used the IQE and the scheduler work together to perform the replication operation over multiple frame periods. This is achieved by the IQE maintaining the multicast segments in the queue and repeatedly sending them out, one copy per destination ESM of the multicast group, and deleting the segments from the queue after sending the last copy. Because a frame can be sent only to a single destination during each frame period, this takes as many frame periods as the number of distinct ESMs that need to receive a copy of the multicast data.

Serial replication provides the opportunity to combine unicast segments in the frame along with the multicast segments, increasing the utilization of the fabric. For example, when the ingress module is sending its multicast segments to one of the ICDEs, the remainder of the frame can be filled with unicast segments queued for that ICDE. When there is only a small amount of multicast data to send, this piggybacking of unicast data with multicast data improves the utilization of the crossbar planes considerably. When the multicast packet is being sent to a small number of destination ESMs, serial replication may be preferred.

Spatial replication is used when the crossbar planes have replication capability. In spatial replication, the scheduler may set up the planes to replicate the data from the IQE to the intended recipient ICDEs. The IQE then needs to transmit only a single instance of the framed multicast segments over the crossbar planes, just as in the unicast case. When the number of destination ESMs is large, spatial replication may significantly decrease the delay for the multicast packet as compared to sending the packet over several frame periods. Thus, the ability to select between serial replication and spatial replication, taking into account the number of destination ports and traffic characteristics of each multicast group is beneficial.

The queuing devices in the ICDE stage receives as many copies of a multicast segment as the number of distinct ESMs that need to receive the segment. For example, if the fabric ports destinations of a multicast packet are located within five distinct ESMs, then the ICDEs altogether will receive five copies of the same segment (with either the IQE or the crossbar planes performing the replication). Because all the ICDE devices in the ISM are connected to the same ESM during a frame period of the Core Switch Module, the copies can be sent to any of the ICDE devices in the ISM. However, it is beneficial if all multicast segments originating at a particular IQE and destined for a particular destination ESM are sent to the same ICDE to avoid the segments getting out of order in the fabric. The ICDEs can serve as a load balancing stage for the multicast segments. Thus, it is desirable to distribute copies of the multicast segments among the ICDE devices as uniformly as possible, so that none of the devices is overloaded.

According to one embodiment, the destination ICDE can be selected as a function of its originating IQE address and its destination ESM address (e.g., add the two address values and use the least significant bits of the result as the ICDE address). For illustration, consider a system with 32 ISMs (and the same number of ESMs) and 32 ICDEs per ISM. Consider a first multicast segment queued at the IQE numbered 6 for delivery to the ESM numbered 28, and a second multicast segment queued at IQE 7 for delivery to ESM 6. The corresponding ICDE address for the first segment is given by 6+28=34, and subtracting 32 to get the module−32 sum (and ICDE address) of 2. The corresponding ICDE address for the second segment is given by 7+6=13, so that the ICDE address is 13.

The serial versus spatial replication option may be specified by the user by programming the serial multicast bit 1930 in the multicast lookup table 1900. On receiving a request from an IQE to schedule the transmission of multicast segments, the scheduler performs a lookup of the multicast lookup table at the location pointed by the MID specified in the request, to obtain the ESM bitmap 1920 associated with the multicast group. If serial replication is specified for this MID (e.g., the serial multicast bit 1930 is active (set to '1')), the scheduler stores the bitmap in a temporary register. The scheduler selects the ESM corresponding to the first "1" in the bitmap as the destination of the packet in the current schedule. The scheduler then determines the address of the ICDE to receive this frame (containing the multicast segments) by applying a load-balancing function (e.g., the method described above). The scheduler communicates the address of the ICDE so selected in a grant message sent to the requesting IQE. The requesting IQE, on receiving the grant message, dequeues the queued segments from the head of its multicast queue corresponding to the MID in its request, and transmits them over the crossbar planes as a frame. The IQE also maintains the content of the transmitted multicast segments in a temporary buffer so that copies can be transmitted in subsequent frame periods. The IQE may optionally piggyback unicast segments destined to the same ICDE if space is available in the frame after inserting all the multicast segments with the same MID.

If the bitmap has more than one "1", the above sequence is repeated for each "1" in the bitmap during the subsequent frame times, resulting in the IQE sending a separate copy of the multicast segments to the ICDE selected as destination in each cycle. The last grant to the IQE from the scheduler is marked with a special type to instruct the IQE that the segments must be removed from the buffer after transmitting them.

While sending the grant to the IQE, the scheduler may optionally send a corresponding grant message to the ICDE selected as destination of the multicast segments. This enables the receiving ICDE to detect any errors in the setting of the crossbar planes that cause data to be delivered to an incorrect ICDE.

With spatial replication, a request from an IQE to schedule the transmission of multicast segments is sent to the scheduler. The scheduler performs a lookup of the multicast lookup table at the location corresponding to the MID specified in the request to obtain the ESM bitmap associated with the multicast group. The scheduler then determines the address of each of the ICDEs to receive this frame (consisting of the multicast segments) by, for example, applying the load-balancing function described above. The scheduler communicates the address of the first ICDE in this set in a grant message sent to the requesting IQE, and also specifies that the crossbar planes will replicate the segments. The requesting IQE, on receiving the grant message, de-queues the queued segments from the head of its multicast queue corresponding to the MID in its request, and transmits them over the crossbar planes as a frame. The IQE may also remove the segments from its queue permanently.

In parallel with transmitting the grant messages to the ICDEs, the scheduler may set up the crossbar planes so that the packet transmitted by the source IQE of the multicast will be replicated to all the ICDEs as determined above. While sending the grant to the IQE, the scheduler may also send a corresponding grant message to each of the ICDEs selected as destinations of the multicast segments. This enables the receiving ICDEs to detect any errors in the setting of the crossbar planes that cause data to be delivered to an incorrect ICDE.

Grant messages are sent from the ISM scheduler to the IQE and ICDE devices within grant frames. If the IQE and ICDE for the same index are packaged together (within the same chip, for example) the grant messages sent to the IQE and to the ICDE can be sent in the same frame. For unicast traffic, and multicast traffic sent via serial replication, the grant message to the IQE identifies the ICDE it should be sending data to. The message to the ICDE identifies the IQE it should be receiving data from. The grant frame format when multicast traffic is present, combining the messages to the IQE and the ICDE, comprises various fields, similar to those described above with reference to FIG. 9. The fields in the grant frame may include, for example, a grant type, a destination ESM address, a destination ICDE address and a starting priority. The ESM address, ICDE address, and starting priority have the same purpose and function as described above with respect to FIG. 9. The destination ESM address and destination ICDE address are particularly suited for serial replication. In one embodiment, however, the grant type can include designations in addition to the "no grant" or "unicast grant" described above for unicast transmission. Specifically, the additional grant types may include "multicast grant for spatial replication", "multicast with unicast piggyback", "last multicast with unicast piggyback" and "flush multicast."

A grant type of "multicast grant for spatial replication" instructs the IQE to transmit from the multicast queue associated with the requested MID, and discard the transmitted segments from the queue after transmission. No unicast traffic can be transmitted in that frame. This is typically used when the scheduler uses spatial replication. A grant of "multicast with unicast piggyback" instructs the IQE to transmit from the multicast queue associated with the requested MID. After, inserting all the queued segments with this MID in the frame, any remaining space in the frame can be filled with unicast segments queued for the ICDE specified in the grant message. This grant type is useful with serial replication. The multicast segments transmitted are still retained by the transmitting IQE in a buffer.

A grant type of "last multicast transmission with unicast piggyback" is similar to the "multicast with piggyback transmission," except that it instructs the IQE to remove the multicast segments from the queue after transmission. Finally the grant type of "flush multicast" instructs the IQE to flush the segments associated with the requested MID from the queue. This may be used to recover from error conditions.

The grant to the ICDE comprises the address of the IQE that is the source of the data, the address of the ESM where the data is destined to, and a valid bit to indicate that the grant is valid. On receiving a frame, the ICDE extracts each segment and queues them individually based on the destination address of the ESM. For unicast segments, this ESM destination address can be derived from the destination fabric port address contained in the segment header. For multicast segments, the address of the destination ESM is extracted from the grant message received from the scheduler. Thus, the unicast and multicast segments share the queues based on the destination ESM.

In one embodiment, the ICDEs make no distinction between unicast and multicast segments while forwarding them across the CSM to the destination ESM. That is, in one embodiment, no replication is performed between the ICDEs and the ECDEs in the destination ESM. During each frame time of the CSM, the CSM scheduler connects the ICDE stage in an ISM to the ECDE stage of an ESM. When connected to a specific ESM, the ICDEs de-queue data from the queue associated with that ESM and transmit the data through the CSM to the ECDE elements in the destination ESM.

Figure 20:
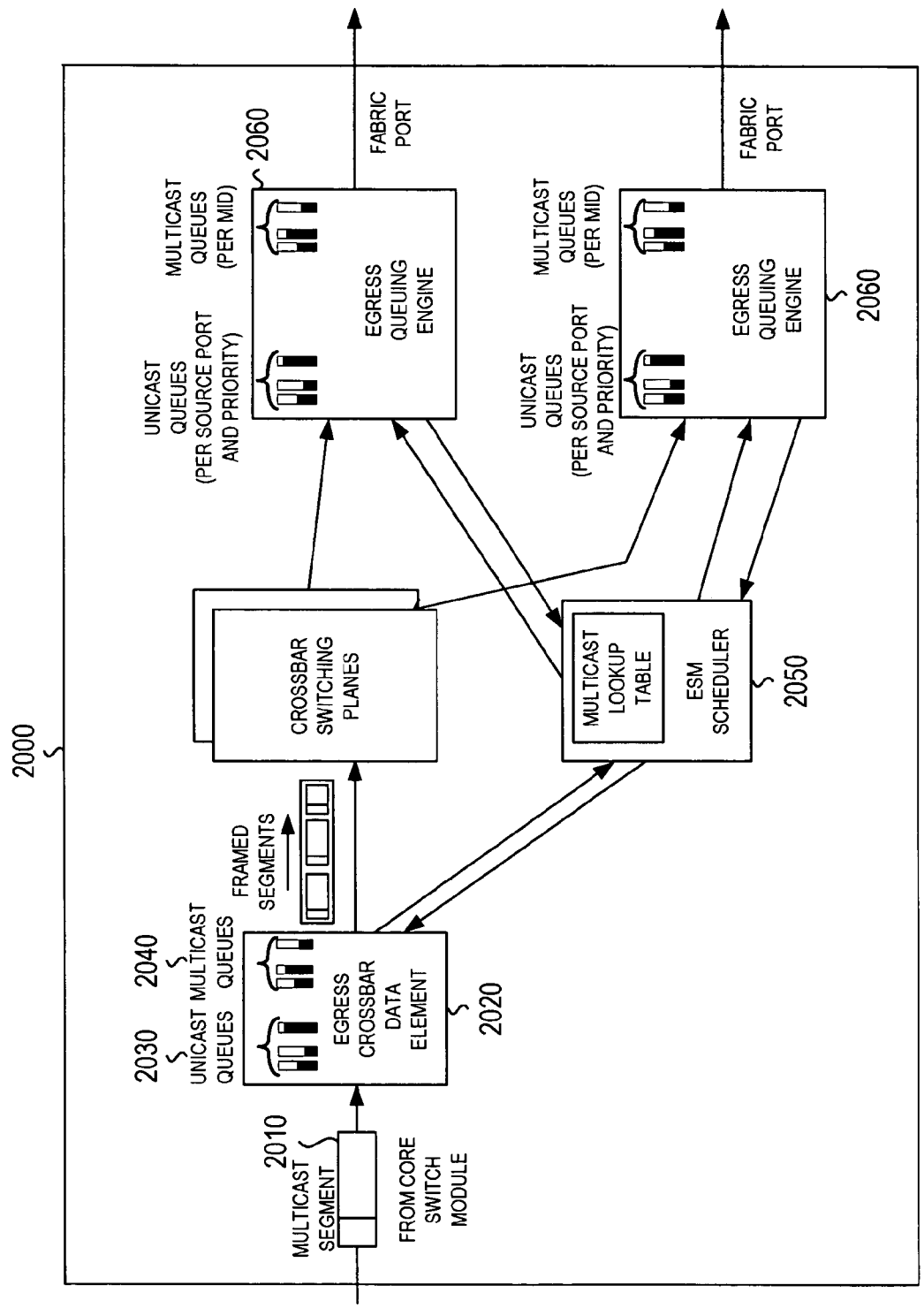
FIG. 20 illustrates an exemplary block diagram of an ESM for transmission of multicast packets, according to one embodiment.

FIG. 20 illustrates an exemplary operation of the ESM 2000 with respect to handling multicast data. Multicast data 2010 arriving at ECDE 2020 is in the form of framed segments, which may comprise segments from unicast and/or multicast data packets. The ECDE 2020 extracts the segments from the frame and stores them in queues (e.g., queues for unicast segments 2030 and queues for multicast segments 2040). A separate unicast queue 2030 is provided for each fabric port (destination port) located within the ESM 2000. Optionally, there may be multiple unicast queues 2030 per fabric port (e.g., one per priority level). The multicast segments can all be stored in a single multicast queue 2040 dedicated to multicast packets, or can be distributed among several multicast queues based on MID and optionally other factors (e.g., priority level).

Each ESM 2000 receiving a copy of a multicast segment will transmit it to all fabric ports (destination ports) that are members of the multicast group associated with the segment. This replication operation can be performed in the same fashion as discussed above with respect to the ISM 1700 (FIG. 17). The ECDEs 2010, in conjunction with ESM scheduler 2050, are responsible for replicating the packet to all EQEs 2060 that are connected to the multicast destinations. The ECDEs 2010 send requests to ESM scheduler 2050 in the form of request frames as described above with respect to the ISM (FIG. 18).

The ECDE in which segments of the multicast packet are queued, is responsible for replication of the multicast data at the port-level. That is, the ECDE must deliver to the EQE stage a separate copy of the data for each of its destination ports within the ESM. As with replication in the ISM, replication in the ESM can be accomplished by either spatial replication or serial replication, based on the replication capabilities of the crossbar planes. As discussed with respect to the ISM, a bit in a multicast lookup table may be used to select between spatial and serial replication if the switch fabric supports both.

The ESM scheduler 2050 sends grants in the form of grant frames to the appropriate ECDEs. The ESM scheduler may also sent grants to the appropriate EQEs. This enables the receiving EQEs to detect any errors in the setting of the crossbar planes that cause data to be delivered to an incorrect EQE. The ESM grant frames are much like the ISM grant frames described above.

When an EQE receives a frame, the EQE extracts each segment and queues the segments based on the fabric port (origination port) that transmitted the segment. That is, all multicast segments originating from a particular fabric port are added to the multicast queue corresponding to that particular port. Thus, each EQE maintains as many multicast queues as the number of fabric ports in the entire switching system. Similarly, there is a separate set of queues for unicast packets, with at least one queue designated for unicast segments originating from each fabric port. When multiple priorities are present, one queue is needed per fabric port and priority level.

Each queue within the EQE also acts as a reassembly buffer to reassemble the segments into packets. As each segment is added to the queue, the queue state is updated to reflect the added segment. In addition, an end of packet (EOP) bit in each segment is monitored so that a count of complete packets can be maintained. A local egress scheduler within the EQE is responsible for making decisions to dequeue packets from a reassembly buffer. A queue is eligible for dequeueing if it has at least one full packet. In one embodiment, the scheduler selects the queue for dequeueing based on a service discipline such as round robin or strict priority. The dequeued segments are then reassembled into the original packet and forwarded to a line card associated with the destination port.

While the embodiments have been described in detail with reference to a multistage switch, the replication method described is equally useful in single stage switch systems. A single stage switch would have ingress modules and egress modules and the data packets would be switched from an ingress module to one or more egress module. Thus, in one embodiment using a single stage switch, the multicast data would be replicated within the single stage switch and a multicast message can be received and stored in a multicast queue. A lookup table could, in such an embodiment, be used to determine how many copies of the data packet need to. be made and to which egress modules those data packet copies need to be transferred. Once the packets are transferred to the egress modules, the data packet could then again be replicated, as in the multicast switch embodiments, and distributed to the ports served by that egress module.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

What is claimed is:

1. A multi-stage switch comprising:
at least one ingress switching module to receive data packets, to switch the data packets, to generate frames from the switched data packets, and to form wavelength division multiplexed signals from the frames, wherein said at least one ingress switch module comprises at least one ingress queuing engine operatively connected to transmit the data packets to at least one crossbar switch plane, which is operatively connected to switch the data packets to at least one ingress crossbar data element, wherein data transfer is controlled by an ingress scheduler, wherein said at least one ingress switch module further includes a multicast lookup table, the multicast lookup table used to identify egress switching modules associated with a multicast data packet, wherein the multicast lookup table is also used to determine type of replication associated with the multicast data packet, wherein multicast data packets are assigned a multicast identification, and wherein the multicast lookup table identifies the associated egress switching modules and the type of replication to be used based on the multicast identification;
a core switching module operatively connected to receive the wavelength division multiplexed signals from the at least one ingress switching module and to switch the wavelength division multiplexed signals; and
at least one egress switching module to receive the wavelength division multiplexed signals from the core switching module, to extract the frames from the wavelength division multiplexed signals, to extract the data packets from the frames, to switch the data packets, and transmit the data packets,
wherein said at least one ingress switching module and said at least one egress switching module are capable of replicating multicast data packets.

2. The switch of claim 1, wherein a particular ingress switching module distributes data packets destined for a particular egress switching module across the at least one crossbar switch plane such that the data packets destined to the particular egress switching module are distributed as evenly as possible across the at least one ingress crossbar data element.

3. The switch of claim 2, wherein data packets queued in different ones of the at least one ingress crossbar data element associated with the particular ingress switching module and destined to the particular egress switching module are switched in parallel across the core switching module to the particular destination egress switching module.

4. The switch of claim 1, wherein said at least one egress switch module includes a set of internal sub-modules and the particular egress switch module uses the set of internal sub-modules to receive the data arriving from the core switch module.

5. The switch of claim 1, wherein an ingress switching module will replicate a multicast data packet if the multicast data packet is to be delivered from the ingress switching module to at least two egress switching modules.

6. The switch of claim 1, wherein the ingress queuing engine replicates the multicast data packets and transmits copies of the multicast data packets in consecutive frame periods if serial replication is identified.

7. The switch of claim 1, wherein the ingress queuing engine transmits the multicast data packet to the at least one crossbar switch plane and the at least one crossbar switch plane transmits the multicast data packet to multiple ingress crossbar data elements associated with the identified egress switching modules during a frame period if spatial replication is identified.

8. The switch of claim 1, wherein said at least one ingress switch module further includes a framer and wavelength division multiplexer transmitter to form frames from stored segments and create a wavelength division multiplexed optical signal of the frames from the at least one ingress crossbar data elements.

9. The switch of claim 1, wherein the ingress scheduler controls data flow by arbitrating amongst received requests.

10. The switch of claim 9, wherein the requests associated with multicast data packets include a new multicast request field that is active until a first grant for the multicast data packet is received and is used for error detection and recovery of grants.

11. The switch of claim 1, wherein an egress switching module will replicate a multicast data packet if the multicast data packet is to be delivered from the egress switching module to at least two destinations.

12. The switch of claim 1, wherein said at least one egress switch module comprises at least one egress crossbar data element, operatively connected to transmit the data packets to at least one crossbar switch plane, which is operatively connected to switch the data packets to at least one egress queuing engine, and an egress scheduler to control data transfer therethrough.

13. The switch of claim 12, wherein said at least one egress switch module further includes a multicast data lookup table, the multicast lookup table used to determine at least some subset of destinations associated with said at least one egress switch module and type of replication to be used for the multicast data packet.

14. The switch of claim 12, wherein said at least one egress switch module further includes a wave division receiver and deframer to receive a wavelength division multiplexed signal from said core switching module and extract frames therefrom.

15. A method comprising:
receiving data packets at a multistage switch, wherein the multistage switch includes a plurality of ingress switching modules, a core switching module operationally connected to the plurality of ingress switching modules, and a plurality of egress switching modules operationally connected to the core switch module, and wherein the data packets received by the ingress switch modules may include multicast packets that are destined for at least two destinations;

for multicast packets, utilizing a multicast lookup table within the ingress switching modules to identify which egress switching modules a multicast data packet is destined for and what type of replication should be used based on a multicast identification assigned to the multicast data packet, replicating the multicast packet for the at least two destinations, wherein said replicating can be distributed between receiving ingress switching module and egress switching modules associated with the at least two destinations;

within the ingress switching modules, switching the data packets, aggregating the data packets destined for different egress switching module into frames, generating wavelength-division multiplexed (WDM) optical signals from the frames, and transmitting the WDM optical signals to the core switching module;

switching the WDM optical signals through the core switch module via multiple channels;

within the egress switching modules, receiving the WDM optical signals, extracting frames from the WDM optical signals, extracting the data packets from the frames, switching the data packets, and transmitting the data packets to destinations.

16. The method of claim 15, wherein said replicating includes replicating the multicast packet in the ingress switching module if the multicast packet is associated with more than one egress switching module.

17. The method of claim 16, wherein number of times the multicast data packet is replicated is based on number of associated egress switching modules.

18. The method of claim 15, wherein said replicating includes replicating the multicast packet in an associated egress switching module if the multicast packet is associated with more than one destination for the associated egress switching module.

19. The method of claim 18, wherein number of times the multicast data packet is replicated is based on number of destinations associated with the associated egress module.

20. The method of claim 15, wherein said replicating includes spatial replicating where the replication and transmission of the multicast data packet is performed during a single frame period by utilizing multiple crossbar planes.

21. The method of claim 15, wherein said replicating includes serial replication where the replication and transmission are performed one copy at a time during consecutive frame periods.

22. The method of claim 15, wherein multicast packets received are assigned a multicast identification, and further comprising utilizing a multicast lookup table to identify parameters associated with the multicast packet based on the assigned multicast identification.

23. The method of claim 22, wherein a parameter associated with the multicast identification is identity of egress switching modules associated with the multicast data packet.

24. The method of claim 22, wherein a parameter associated with the multicast identification is type of replication to be performed for the multicast data packet.

25. The method of claim 22, wherein a parameter associated with the multicast identification is identity of destinations associated with the multicast data packet.

26. The method of claim 15, further comprising utilizing a multicast lookup table within the egress switching modules to identify which destinations a multicast data packet is destined for and what type of replication should be used based on a multicast identification assigned to the multicast data packet.

27. The method of claim 15, further comprising
activating a new multicast request field within a request frame of a multicast data packet until a first grant is received for the multicast data packet, and
utilizing the new multicast field to detect and correct errors in multicast grants.

* * * * *